(12) United States Patent
Gulati et al.

(10) Patent No.: US 12,123,737 B2
(45) Date of Patent: Oct. 22, 2024

(54) TRUNCATING GRAPHICAL ROUTE SUMMARIES OF TRANSIT ROUTES FOR DISPLAY VIA GRAPHICAL USER INTERFACES

(71) Applicant: Lyft, Inc., San Francisco, CA (US)

(72) Inventors: Mayank Gulati, San Francisco, CA (US); Matthew Burt Logan, Seattle, WA (US); Assaf Haim Shalev, San Francisco, CA (US); Sherzod Makhmudjanov, San Francisco, CA (US); Steven Kuo, Seattle, WA (US); Mike Docherty, Seattle, WA (US)

(73) Assignee: Lyft, Inc., San Francisco, CA (US)

( * ) Notice: Subject to any disclaimer, the term of this patent is extended or adjusted under 35 U.S.C. 154(b) by 879 days.

(21) Appl. No.: 16/911,108

(22) Filed: Jun. 24, 2020

(65) Prior Publication Data
US 2021/0404836 A1 Dec. 30, 2021

(51) Int. Cl.
*G01C 21/36* (2006.01)
*G01C 21/34* (2006.01)

(52) U.S. Cl.
CPC ..... *G01C 21/3676* (2013.01); *G01C 21/3423* (2013.01); *G01C 21/3626* (2013.01)

(58) Field of Classification Search
None
See application file for complete search history.

(56) References Cited

U.S. PATENT DOCUMENTS

| | | | | |
|---|---|---|---|---|
| 2009/0082958 | A1* | 3/2009 | Ishii | G01C 21/20 701/438 |
| 2009/0144660 | A1* | 6/2009 | Wako | G01C 21/3682 715/835 |
| 2013/0307876 | A1* | 11/2013 | Jones | G06F 40/103 345/661 |
| 2014/0278105 | A1* | 9/2014 | Canfield | G01C 21/3423 701/538 |
| 2014/0330517 | A1* | 11/2014 | Barnes | G01C 21/3626 701/400 |
| 2016/0231129 | A1* | 8/2016 | Erez | G01C 21/3423 |
| 2016/0356625 | A1* | 12/2016 | O'Beirne | G01C 21/3676 |

(Continued)

*Primary Examiner* — Rachid Bendidi
*Assistant Examiner* — Selena M Jin
(74) *Attorney, Agent, or Firm* — Keller Preece PLLC

(57) ABSTRACT

The present disclosure relates to systems, non-transitory computer readable media, and methods for determining a transit route to a destination and generating a shortened graphical summary of the transit route to present on a computing device. For instance, in some cases, a system determines a transit route by which transit vehicles transport a user along route segments to a destination. The system further generates or configures a graphical route summary that includes segment graphics representing route segments from the transit route. To shorten the graphical route summary to fit within a graphical user interface, the system can successively perform one or both of (i) segment-level-truncation operations on individual segment graphics and (ii) summary-level-truncation operations on the graphical route summary. The system can further present a truncated graphical route summary in the graphical user interface based on one or both the segment-level-truncation operations and the summary-level-truncation operations.

20 Claims, 14 Drawing Sheets

(56) References Cited

U.S. PATENT DOCUMENTS

2016/0358471 A1* 12/2016 Hajj .................... G01C 21/3667
2016/0365072 A1* 12/2016 Blumenberg .......... G01C 21/20
2018/0128636 A1*  5/2018 Zhou ................... G01C 21/3632
2018/0266831 A1*  9/2018 Kuji ................... G01C 21/3614

* cited by examiner

TRUNCATING GRAPHICAL ROUTE SUMMARIES OF TRANSIT ROUTES FOR DISPLAY VIA GRAPHICAL USER INTERFACES

BACKGROUND

In recent years, transportation-network systems have introduced significant technological improvements in mobile app-based management of on-demand requests for transportation. Some on-demand transportation-network systems, for example, receive requests from persons through a mobile application requesting transportation from one location to another. On-demand transportation-network systems may match requests from persons seeking transportation with nearby transportation providers. Additionally or alternatively, some on-demand transportation-network systems identify and present various alternative transportation methods by which the requesting person may travel to a desired location. Such alternative transportation methods may include a multi-leg route that includes transportation by bike, bus, train, or other vehicles—as well as transfers between vehicles. To communicate such routes, conventional transportation-network systems sometimes present graphics representing different legs of a multi-leg route on a computing device.

Although conventional on-demand transportation-network systems can present representations of multi-leg routes, conventional systems often face technical problems that cause such systems to inaccurately portray or summarize a route, inefficiently displaying comparisons or options for a route, and rigidly modify or present route representations. Indeed, conventional on-demand transportation-network systems often present route options to users via mobile computing devices with limited screen space. For instance, a conventional system may graphically represent each leg of a multi-leg route in a device or represent only some of the legs with an option to view additional legs of a multi-leg route.

To fit route options within a limited display, conventional systems often present confusing or inaccurate depictions of multi-leg route options. For complex routes that include multiple transfers, conventional systems often display partial route details by omitting important vehicle transfers or other information to meet size constraints. For example, some conventional systems often omit important information relating to transit vehicles in favor of displaying less-useful information. Thus, conventional on-demand transportation-network systems often present inaccurate depictions of potential multi-leg route options.

In addition to inaccurate or confusing representations, conventional on-demand transportation-network systems often inefficiently present comparisons of multi-leg-route options. For instance, many on-demand transportation-network systems provide side-by-side comparisons of various multi-leg route options. However, due in part to the screen-space constraints mentioned above, conventional systems often obscure information that a user would find helpful to compare two route options. Conventional systems often require users to select individual route options to view useful information. Thus, some conventional on-demand transportation-network systems present inefficient side-by-side comparisons of multi-leg route options that confuse users.

In particular, many conventional systems present a combination of whole and partial route options depending on the sizes of the respective options. Such comparisons are often of limited use, especially when partial route options omit important information. For example, conventional systems often determine to display a maximum number of route legs for a multi-leg-route option. Because conventional systems will often display multi-leg-route options showing the same maximum number of route legs, users often cannot view all relevant information. Thus, conventional systems often fail to provide a comparison of route complexity. To evaluate a particular route option, conventional systems often require a user to select the particular route option to view details. To compare more complex multi-leg-route options, conventional systems sometimes require users to navigate through multiple pages to view and compare details of individual multi-leg-route options.

In addition to inefficiently presenting multi-leg-route options, some conventional on-demand transportation-network systems inflexibly rely on a limited and rigid set of parameters to generate multi-leg-route options. In particular, conventional systems often rigidly focus on the same parameters to render the same type of multi-leg-route options for all users. For example, some conventional systems render multi-leg-route options comprising only beginning locations, destination locations, and sometimes traffic information. Thus, conventional systems often present misleading or counterintuitive information concerning multi-leg routes to particular users. For example, conventional systems often convey route options that are already familiar to or otherwise irrelevant to particular users.

These and other disadvantages exist with respect to conventional on-demand transportation-network systems.

SUMMARY

This disclosure describes one or more embodiments of systems, methods, and non-transitory computer readable media that provide benefits and solve one or more of the foregoing or other problems. In particular, the disclosed system determines a transit route comprising route segments to a destination and generates a shortened graphical summary of the transit route to present on a computing device. In some cases, for instance, the disclosed system determines a transit route comprising route segments to a destination location and utilizing one or more transit vehicles. The disclosed system further generates or configures a graphical route summary that includes segment graphics representing individual route segments from the transit route. To shorten the graphical route summary to fit within a graphical user interface, the disclosed system can perform one or both of (i) segment-level-truncation operations sequentially on individual segment graphics and (ii) summary-level-truncation operations on the graphical route summary as a whole. The disclosed system can further present a truncated graphical route summary in the graphical user interface based on one or both the segment-level-truncation operations and the summary-level-truncation operations.

BRIEF DESCRIPTION OF THE DRAWINGS

Various embodiments will be described and explained with additional specificity and detail through the use of the accompanying drawings in which.

DETAILED DESCRIPTION

Figure 1:
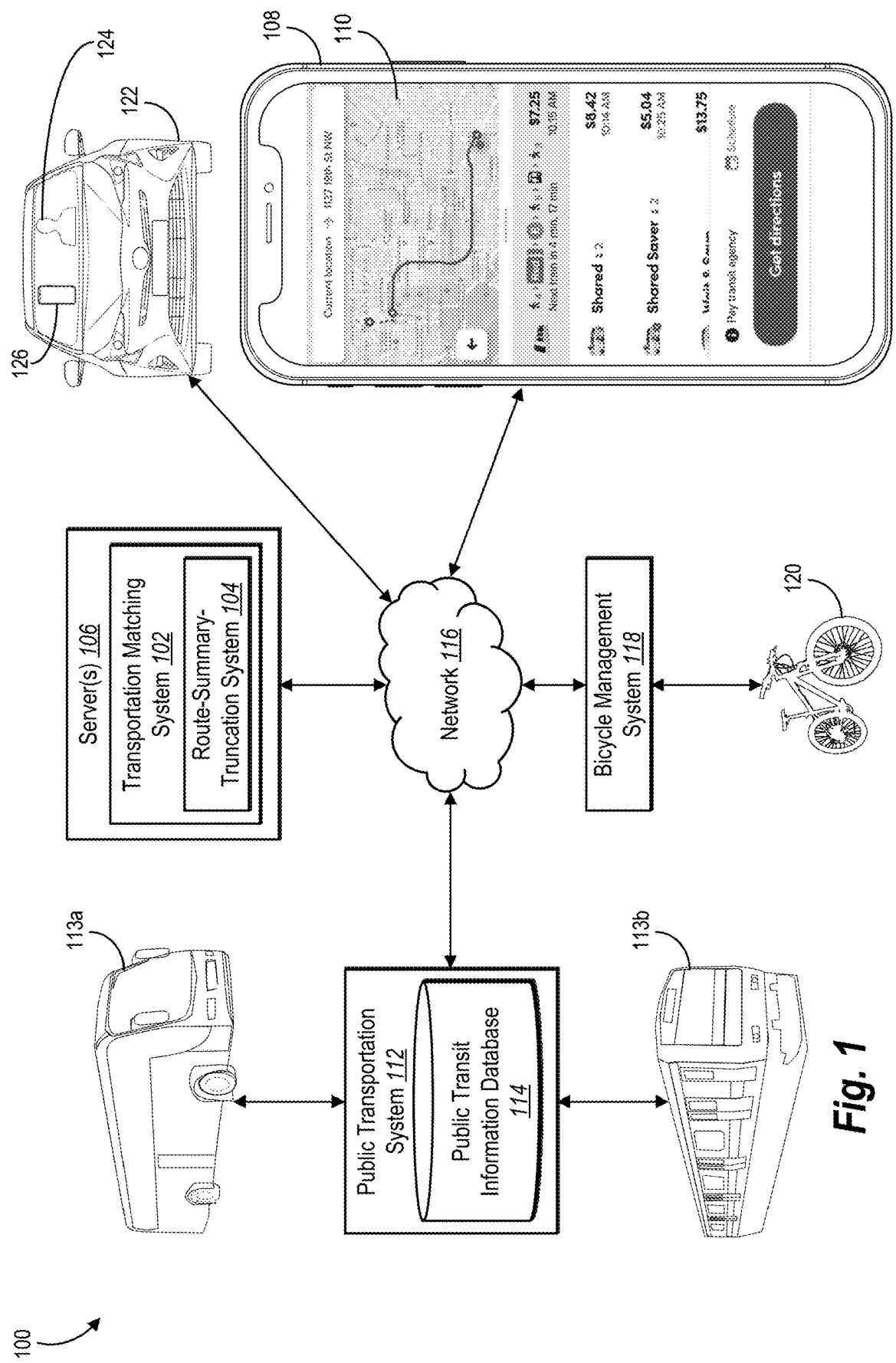
FIG. 1 illustrates an environment in which a route-summary-truncation system can operate in accordance with one or more embodiments.

This disclosure describes one or more embodiments of a route-summary-truncation system that can determine a transit route comprising route segments to a destination and generate a shortened route summary for display within a graphical user interface by performing one or both of segment-level-truncation operations and summary-level-truncation operations. In particular, the route-summary-truncation system can determine a transit route comprising route segments to a destination location and utilizing one or more transit vehicles. The route-summary-truncation system further configures or generates a graphical route summary of the transit route comprising graphical representations of route segments and transfers between route segments. For example, the graphical route summary may include vehicle icons, transit route names, or other segment graphics corresponding to route segments. To shorten the graphical route summary, the route-summary-truncation system can successively perform truncation operations on one or both of individual segment graphics and the graphical route summary as a whole—while preserving important route-segment information in the summary. The route-summary-truncation system may further present the truncated graphical route summary within a graphical user interface.

As suggested above, in certain implementations, the route-summary-truncation system determines a transit route comprising route segments to a destination location and utilizing one or more transit vehicles. In particular, a transit route often includes one or more route segments along some of which transit vehicles transport a user. For example, a single transit route may include a bus for a first route segment and (upon transfer) a train or another bus for a second route segment. In some cases, the route-summary-truncation system identifies a group of alternative route segments within the transit route. For example, for a single route segment, the route-summary-truncation system can identify a bus route, a train route, or other alternative transit options by which a user can complete a particular leg of the transit route.

After determining a transit route, the route-summary-truncation system can configure or generate a graphical route summary that represents the transit route. In particular, the route-summary-truncation system may generate a segment graphic corresponding to each route segment. For example, a segment graphic might include one or both of a vehicle icon indicating a type of transit vehicle (e.g., bike, bus, train) for a route segment and a route-segment name identifying a name (or abbreviation thereof) for the route segment. In some embodiments, the route-summary-truncation system represents a group of alternative route segments by identifying a segment graphic for each alternative route segment within the group. As indicated above, the route-summary-truncation system may not present the whole graphical route summary due to screen-size constraints of user devices and corresponding graphical user interfaces. Based on determining that the graphical route summary fails to fall within a threshold size, the route-summary-truncation system truncates the graphical route summary.

In some implementations, the route-summary-truncation system reduces the size of the graphical route summary by successively performing segment-level-truncation operations. In particular, the route-summary-truncation system may perform a segment-level-truncation operation on a segment graphic, determine whether the graphical route summary comprising a truncated segment graphic fits within the threshold size based on the segment-level-truncation operation, and—if the graphical route summary does not fit—continue performing the segment-level truncation operation on additional segment graphics. In some cases, the route-summary-truncation system determines not to perform a segment-level-truncation operation on a segment graphic because, for example, performing such an operation would not shorten the graphical route summary.

The route-summary-truncation system may apply segment-level-truncation operations to a segment graphic for a route segment without alternatives within a transit route or to segment graphics corresponding to a group of alternative route segments representing interchangeable route segments for a single route segment. For example, in some cases, the route-summary-truncation system removes one or more characters from terminal route-segment names or replaces a route-segment name with a vehicle icon. When a transit route includes a group of alternative route segments, for instance, the route-summary-truncation system may limit the number of segment graphics to a maximum number of alternative route segments, collapse alternative segment graphics for alternative route segments, or perform other various segment-level-truncation operations.

In some embodiments, the route-summary-truncation system orders or selectively applies segment-level-truncation operations. For example, the route-summary-truncation system can prioritize immediately necessary route information by performing segment-level-truncation operations initially on terminal segment graphics and then on initial segment graphics, if necessary. In one or more embodiments, the route-summary-truncation system performs segment-level-truncation operations beginning with a terminal segment graphic (e.g., a segment graphic representing a vehicle furthest to the right—or closest in order to a destination location—in a graphical route summary). When reviewing a transit route as an option, a user may be more interested in viewing detail regarding which transit vehicles the user must initially ride to reach a next transfer location. Thus, in some embodiments, the route-summary-truncation system often performs segment-level-truncation operations in a sequence—initially on terminal segment graphics representing segment routes near the end of a transit route and then on segment graphics representing segment routes nearer to the beginning of the transit route.

In addition (or in the alternative) to segment-level-truncation operations, the route-summary-truncation system may perform summary-level-truncation operations to the graphical route summary as a whole. In some embodiments, the route-summary-truncation system may determine to perform summary-level-truncation operations if the graphical route summary does not fit within a threshold size for a graphical user interface—after performing the segment-level-truncation operations. When performing summary-level-truncation operations, for example, the route-summary-truncation system may remove space between segment graphics, remove duration indicators for walking and biking segments, remove walking and biking segments, or remove a terminal segment graphic, among other options described below.

The route-summary-truncation system may also use segment graphics or perform truncation operations specific to a geographic location. In particular, the route-summary-truncation system may utilize concise local segment graphics that omit information with which local users are likely familiar. For example, users in a particular geographic region may be more familiar with certain modes of transportation and corresponding graphics and less familiar with others. The route-summary-truncation system may identify route segments familiar to users from a geographic location and use a local segment graphic (without additional information) that local users are likely to identify. In New York City, for instance, the route-summary-truncation system may simply present a route number and omit a vehicle icon indicating the vehicle type for a bus or train route with an easily identifiable route number.

As mentioned, the route-summary-truncation system may present a truncated graphical route summary within a graphical user interface. In particular, the route-summary-truncation system may transmit data for a computing device to present within a route selector graphical user interface. The computing device can present and compare graphical route summaries representing various transit-route options within a route selector graphical user interface. More particularly, in some embodiments, the route-summary-truncation system truncates a graphical route summary to present a snapshot of the corresponding transit route as a whole rather than comprehension of specific route segments or legs. The route-summary-truncation system may present, to a user, the most relevant information required by the user to quickly decide which transit route to select.

As suggested above, the route-summary-truncation system provides numerous technical advantages and practical applications relative to conventional transportation-network systems. For instance, the route-summary-truncation system improves the efficiency with which transportation-network systems present and summarize transit routes in a graphical user interface, particularly in mobile computing devices or other computing devices with relatively small screens. As mentioned above, conventional transportation-network systems often require users to navigate through multiple interfaces to understand a multi-leg route or individual route segments for a multi-leg-route option. By performing one or both of segment-level-truncation operations and summary-level-truncation operations, the route-summary-truncation system captures an efficient snapshot of a transit route in a relatively small space of a graphical user interface. The route-summary-truncation system accordingly presents or provides truncated graphical route summaries as snapshots of a multi-segment route and avoids the user navigation that hinder conventional system. In addition to the efficiency of a single snapshot, in some cases, the route-summary-truncation system further presents efficient comparisons of various potential multi-segment-route options by including relevant route details within a single graphical user interface.

In addition to improving graphical summaries of multi-segment routes, in some embodiments, the route-summary-truncation system improves the flexibility with which transportation-network systems shorten and summarize multi-segment routes in a graphical user interface. In particular, the route-summary-truncation system can perform an ordered combination of unconventional operations to customize a graphical representation of a multi-segment route within the size constraints of a particular computing device or its graphical user interface. In at least one embodiment, for instance, the route-summary-truncation system performs an ordered series of segment-level-truncation operations and summary-level-truncation operations to shorten graphical route summaries. For instance, the route-summary-truncation system may successively perform the segment-level-truncation operations of removing a character within a route-segment name and replacing a segment graphic with a vehicle icon—across segment graphics within a graphical route summary. After performing these or other segment-level-truncation operations, the route-summary-truncation system may further perform the summary-level-truncation operations of removing space between segment graphics of the graphical route summary and removing time-duration indicators from the graphical route summary. As described below, FIGS. 3A-3B and FIGS. 5-6 separately or together depict examples of such an ordered combination of operations. By performing an ordered combination of operations, the route-summary-truncation system may flexibly modify and shorten a graphical route summary to fit within space constraints.

In addition to improved efficiency or flexibility, in certain implementations, the route-summary-truncation system more accurately portrays or summarizes a transit route with multiple route segments than conventional transportation-network systems. For instance, the route-summary-truncation system can generate a more accurate snapshot of a multi-segment-transit route that both identifies relevant segment information and also utilizes intuitive graphics. By successively performing one or both of segment-level-truncation operations and summary-level-truncation operations, the route-summary-truncation system can indicate key information that is often omitted by conventional systems. Unlike the confusing or inaccurate depictions of multi-leg routes presented by some conventional transportation-network systems, in some embodiments, the route-summary-truncation system implements truncation operations that avoid omitting or obscuring important route segments or transfers. For example, the route-summary-truncation system may depict an initial route segment, indicate the number of route segments within a transit route, or indicate alternative route segments when conventional systems omit such information.

As illustrated by the foregoing discussion, the present disclosure utilizes a variety of terms to describe features and advantages of the route-summary-truncation system. For example, as used herein, the term "transit route" refers to a travel course or route from one location to another location for one or more transit vehicles. A transit route may include multiple route segments, such as one or more road segments, track segments, or waterway segments. In particular, a transit route may include route segments to a destination location and at least one transfer for at least one transit vehicle. For example, a transit route can comprise one or more route segments associated with transit vehicles connected by transfer points.

Relatedly, as used herein, the term "transit vehicle" refers to a transportation vehicle that transports (or has the capacity to transport) one or more persons. In particular, a transit vehicle operates in association with a public transit system or with a publicly available system of transport. For example, a transit vehicle can include, but is not limited to, an airplane, a bus, a ferry, or a train. In some embodiments, a transit vehicle can include an autonomous vehicle where all or part of the navigation and/or driving functionality of the transit vehicle is performed by a computer system.

As used herein, the term "route segment" refers to a part or portion of a larger route. In particular, a route segment comprises a portion of a route along which a user travels using a transit vehicle or using another mode of transportation, such as walking. A route segment may be associated with a specific transit vehicle, a user-accessible vehicle (e.g., bicycle, scooter), or no vehicle (e.g., a walking segment). To illustrate, for a first route segment, the user may walk to a bus stop. For a second segment, the user may travel from the bus stop to another location by riding a bus. For a third segment, the user may ride a different bus or a train to the destination location.

Relatedly, the term "alternative route segment" refers to a route segment from among multiple route segments that could be used to travel from one location to another location. In some embodiments, alternative route segments represent routes by which a user may travel the length of a single portion of a route—or from on location to another location—using different transit vehicles (e.g., different trains or different buses). For example, a route may include point A and point B. The user may travel to point A from point B using a number of transit vehicles, each of which corresponds to an alternative route segment.

As used herein, the term "destination location" refers to a geographic place to which someone or something travels or is transported. In particular, destination location refers to a place to which a computing device has indicated a user would like to travel. For example, a computing device may identify GPS coordinates, an address, business name, or other identifying information of a destination location. The route-summary-truncation system may determine a transit route by which a user can travel to the destination location.

As used herein, the term "graphical route summary" refers to a visual representation or depiction of a transit route or data upon which a visual representation or depiction of the transit route can be rendered. In particular, a graphical route summary includes graphical elements—or data for such graphical elements—that illustrate route segments of a transit route. More specifically, in some embodiments, a graphical route summary includes segment graphics (or data for segment graphics) that correspond to route segments of a transit route. For example, a graphical route summary can include an ordered set of images (e.g., arrows), icons (e.g., bus, train, walking, bike), and/or segment identifiers (e.g., bus and/or train route names).

As used herein, the term "segment graphics" refers to graphic representations of route segments or data for graphic representations of route segments. In particular, a segment graphic can include visual graphics (or data for visual graphics) representing a route segment and, if applicable, its corresponding transit vehicle. For example, a segment graphic may include a vehicle icon indicating a vehicle type, a route-segment name, a transit system identifier (e.g., LIRR for the Long Island Rail Road or Caltrain for the California commuter rail line), a transit authority identifier (e.g., CTA for the Chicago Transit Authority or MTA for the Metropolitan Transit Authority of New York), or other identifying information. Additionally, a segment graphic may represent route segments that do not include transit vehicles. For instance, segment graphics include walking segment graphics, biking segment graphics, scooter segment graphics, and others.

As used herein, the term "truncation operation" refers to an action that abbreviates, shortens, or modifies to make smaller a segment graphic for a route segment or a graphical route summary. When performed, truncation operations often decrease the size of a graphical route summary. In some cases, a truncation operation removes a segment graphic to shorten a graphical route summary. As described below, truncation operations may comprise segment-level-truncation operations and/or summary-level-truncation operations.

As used herein, the term "segment-level-truncation operation" refers to a truncation operation performed on a segment graphic representing a route segment. In particular, a segment-level-truncation operation includes an operation that abbreviates or shortens an individual segment graphic within a graphical route summary. In some cases, the route-summary-truncation system applies (or determines not to apply) a segment-level-truncation operation to individual segment graphics one by one in a sequence. Segment-level-truncation operations alter individual segment graphics to reduce the size of individual segment graphics, including an operation that replaces one segment graphic with another alternative or smaller segment graphic. For instance, segment-level-truncation operations may include removing characters from route-segment names, replacing route-segment names with vehicle icons, and other operations described below.

As used herein, the term "summary-level-truncation operation" refers to a truncation operation performed on a graphical route summary or an operation that affects multiple segment graphics within the graphical route summary. In some cases, a summary-level-truncation operation is a truncation operation performed on a graphical route summary (or that affects constituent segment graphics) after exhausting segment-level-truncation operations. In contrast to applying a segment-level-truncation operation to segment graphics sequentially one by one, in some cases, a summary-level-truncation operation alters elements of a graphical route summary to reduce the size of the graphical route summary as a whole. For example, a summary-level-truncation operation includes removing space between segment graphics, removing time-duration indicators, removing segment graphics, and other operations described below.

As used herein, the term "truncated graphical route summary" refers to a shortened or altered graphical route summary. In particular, a truncated graphical route summary refers to a graphical route summary that has undergone alterations by one or more segment-level-truncation operations or summary-level-truncation operations. For example, a truncated graphical route summary includes a combination of truncated segment graphics in a shorter form than an original graphical route summary.

As indicated above, this disclosure includes illustrative figures portraying example embodiments and implementations of the route-summary-truncation system. In accordance with one or more embodiments, FIG. 1 illustrates a schematic diagram of environment 100 in which a route-summary-truncation system 104 can operate. As illustrated in FIG. 1, the environment 100 includes one or more server(s) 106 comprising a transportation matching system 102 that can communicate via a network 116 with a requestor device 108 (examples of which will be described in more detail below with respect to FIG. 11), a public transportation system 112, transit vehicles 113a and 113b, a provider device 126, and a bicycle management system 118. The server(s) 106 can include one or more computing devices to implement the route-summary-truncation system 104. Additional description regarding the illustrated computing devices (e.g., the server(s) 106 and/or the requestor device 108) is provided with respect to FIGS. 11-12 below.

As illustrated in FIG. 1, the server(s) 106 may generate, store, receive, and transmit various types of data including data relating to user devices, transportation requests, provider vehicles, transit vehicles, and other data. The route-summary-truncation system 104 may use the server(s) 106 to communicate with various computing devices. For example, the server(s) 106 receive data including transportation requests from the requestor device 108. The server(s) may also receive location information from and transmit transportation request information to the provider device 126. The server(s) 106 can receive transit information from the public transportation system 112. Additionally, the server(s) 106 can send data to the requestor device 108 including transit route information, graphical route summaries, and other relevant transit data. The server(s) 106 may comprise one or more server devices that implement the transportation matching system 102. The server(s) 106 may also comprise a communication server or a web-hosting server.

In one or more embodiments, the server(s) 106 can include or implement all or a portion of the transportation matching system 102. The transportation matching system 102 receives transportation requests including destination locations and starting locations from the requestor device 108. The transportation matching system 102 analyzes the transportation requests and determines routes by which to transport a user associated with the requestor device 108 to the indicated destination location. For example, the transportation matching system 102 may generate provider vehicle routes (e.g., rideshare routes) by managing the distribution and allocation of transportation requests. More specifically, the transportation matching system 102 can match a transportation request to the provider device 126 based on availability and location information from provider devices. In addition to generating provider-transportation routes, the transportation matching system 102 may also determine transit routes for a requestor. In particular, the transportation matching system 102 may access transit data from the public transportation system 112 to determine transit routes for one or more transit vehicles to transport the user along route segments to a destination location.

As further shown in FIG. 1, the server(s) 106 may include or implement all or a portion of the route-summary-truncation system 104. As shown in FIG. 1, the route-summary-truncation system 104 utilizes the network 116 to communicate with the requestor device 108, the public transportation system 112, and the bicycle management system 118. For example, the route-summary-truncation system 104 communicates with the requestor device 108, the public transportation system 112, and the bicycle management system 118 via the network 116 to determine a transit route, track, and communicate a status of transit vehicles, bicycles, and/or to render graphical user interfaces, such as by rendering truncated graphical route summaries within a graphical route display. In some embodiments, per device settings, the route-summary-truncation system 104 receives device information from the requestor device 108, such as location coordinates (e.g., latitude and longitude) and status (currently riding, not riding) via the network 116.

The route-summary-truncation system 104 communicates with the requestor device 108. As illustrated in FIG. 1, the requestor device 108 includes requestor application 110. In at least one embodiment, the route-summary-truncation system 104 communicates with the requestor device 108 through the requestor application 110. For example, the route-summary-truncation system 104 may receive and provide information to the requestor device 108, including request information, transit vehicle information, and transit route information. Additionally, the requestor application 110 optionally includes computer-executable instructions that, when executed by the requestor device 108, cause the requestor device 108 to perform certain functions, as described below.

For example, the requestor device 108 can include computer-executable instructions that (upon execution) cause the requestor device 108 to communicate with the route-summary-truncation system 104 to display various transit vehicle information via a graphical route display. Indeed, the route-summary-truncation system 104 can communicate with the requestor device 108 to cause the requestor device 108 to present a graphical user interface for the requestor application 110 that includes certain elements, such as a digital map illustrating transit routes on roads, rails, or waterways. Furthermore, and as illustrated in FIG. 1, the requestor device 108 presents a graphical user interface for the requestor application 110 including route options, such as a graphical route summary for a transit route and various other route (e.g., rideshare) options. While FIG. 1 depicts the requestor device 108 as a mobile device, the requestor device 108 may be or comprise any computing device as described in FIGS. 11-12.

As indicated above, the route-summary-truncation system 104 can render (or cause the requestor device 108 to render) a truncated graphical route summary to reflect a potential transit route by which a user may travel to a destination location. For example, in some cases, the requestor device 108 receives, from the transportation matching system 102, a transit route for one or more transit vehicles to transport the user along route segments to a destination location. Additionally, or alternatively, the requestor device 108 may receive a graphical route summary that represents the transit route. The requestor device 108 may generate a truncated graphical route summary that fits within size constraints imposed by the screen or graphical user interface of the requestor device 108. In some embodiments, the requestor device 108 generates a graphical route display that includes the graphical route summary in addition to a digital map. FIG. 1 illustrates an example of one such graphical route display based on instructions from the requestor application 110 within the requestor device 108.

As further illustrated in FIG. 1, the environment 100 includes the public transportation system 112 in communication with the route-summary-truncation system 104. Generally, the public transportation system 112 provides public transit information to the route-summary-truncation system 104. For example, the public transportation system 112 can manage public transportation vehicles of one or more types to arrange routes and schedules, such as routes and schedules for the transit vehicles 113a and 113b. In addition, the public transportation system 112 can collect or gather location, speed, and bearing information from the transit vehicles 113a and 113b. Thus, the public transportation system 112 can generate and organize transit information (e.g., General Transit Feed Specification or "GTFS" data) to provide to the route-summary-truncation system 104.

The public transportation system 112 can include a public transit information database 114 that stores transit information. In some embodiments, the route-summary-truncation system 104 communicates with the public transportation system 112 (or the public transit information database 114) via the network 116 to access or receive transit information concerning the transit vehicles 113a and 113b. For example, the public transit information database 114 stores fare information, route information, schedules, and other transit information for the transit vehicles 113a and 113b.

As further illustrated in FIG. 1, the environment 100 includes the provider device 126. As mentioned, the transportation matching system 102 may generate a provider vehicle route by which to transport the requestor to the destination location. If the requestor selects the provider vehicle route, the transportation matching system 102 can send a transportation request to the provider device 126 associated with a provider vehicle 122, operated by a provider 124, that transports the requestor to the destination. Accordingly, the provider vehicle 122 and the provider 124 are associated with the provider device 126. The provider device 126 communicates with the transportation matching system 102 or the route-summary-truncation system 104. For example, the provider device 126 transmits location information to the transportation matching system 102 or the route-summary-truncation system 104. Additionally, the provider device 126 receives transportation request data required to complete the transportation request. For example, the provider device 126 can receive information regarding the requestor device 108 and/or the associated requestor, a desired destination location, a pickup location, and route information. In some embodiments, the provider device 126 is not associated with the provider 124 but is attached to (or integrated within) the provider vehicle 122.

As further illustrated in FIG. 1, the environment 100 includes the bicycle management system 118. Generally, the bicycle management system 118 manages bikeshare bicycles, such as bicycle 120. The bicycle management system 118 tracks the location of bicycles. Furthermore, the bicycle management system 118 can access and manage user information. For example, the bicycle management system 118 can determine whether a bicycle is currently in use and information associated with users currently renting bicycles. The route-summary-truncation system 104 may communicate with the bicycle management system 118 to determine the availability of bicycles along a transit route. Additionally, the route-summary-truncation system 104 may communicate with the bicycle management system 118 to reserve a bicycle for a user who submits a transportation request. More specifically, the transportation matching system 102 can integrate the use of the bicycle 120 in a route segment of a transit route. In addition to the bicycle management system 118, the environment 100 may also include other types of user-accessible vehicles. For instance, the route-summary-truncation system 104 may also communicate with scooter management systems that manage electric motorized scooters.

Although FIG. 1 illustrates the environment 100 having a particular number and arrangement of components associated with the route-summary-truncation system 104, in some embodiments, the environment 100 may include more or fewer components with varying configurations. For example, in some implementations, the server(s) 106 further include the bicycle management system 118. As a further example, in some embodiments, the route-summary-truncation system 104 communicates directly with the requestor device 108, the public transportation system 112, the provider device 126, and/or the bicycle management system 118, bypassing the network 116. In one or more embodiments, the route-summary-truncation system 104 can be housed (entirely or in part) on the requestor device 108. Additionally, the public transportation system 112 can be located within (e.g., as part of the transportation matching system 102) or externally from the server(s) 106. As a further example, in some embodiments, the provider vehicle 122 may comprise an autonomous vehicle or a hybrid self-driving vehicle with both self-driving functionality and some human operator interaction.

When the provider vehicle 122 comprises an autonomous vehicle or a hybrid self-driving vehicle, the provider vehicle 122 may include additional components not depicted in FIG. 1. Such components may include location components, one or more sensors by which the autonomous vehicle navigates, and/or other components necessary to navigate without a human operator (or with minimal interactions with a human operator).

Figure 2:
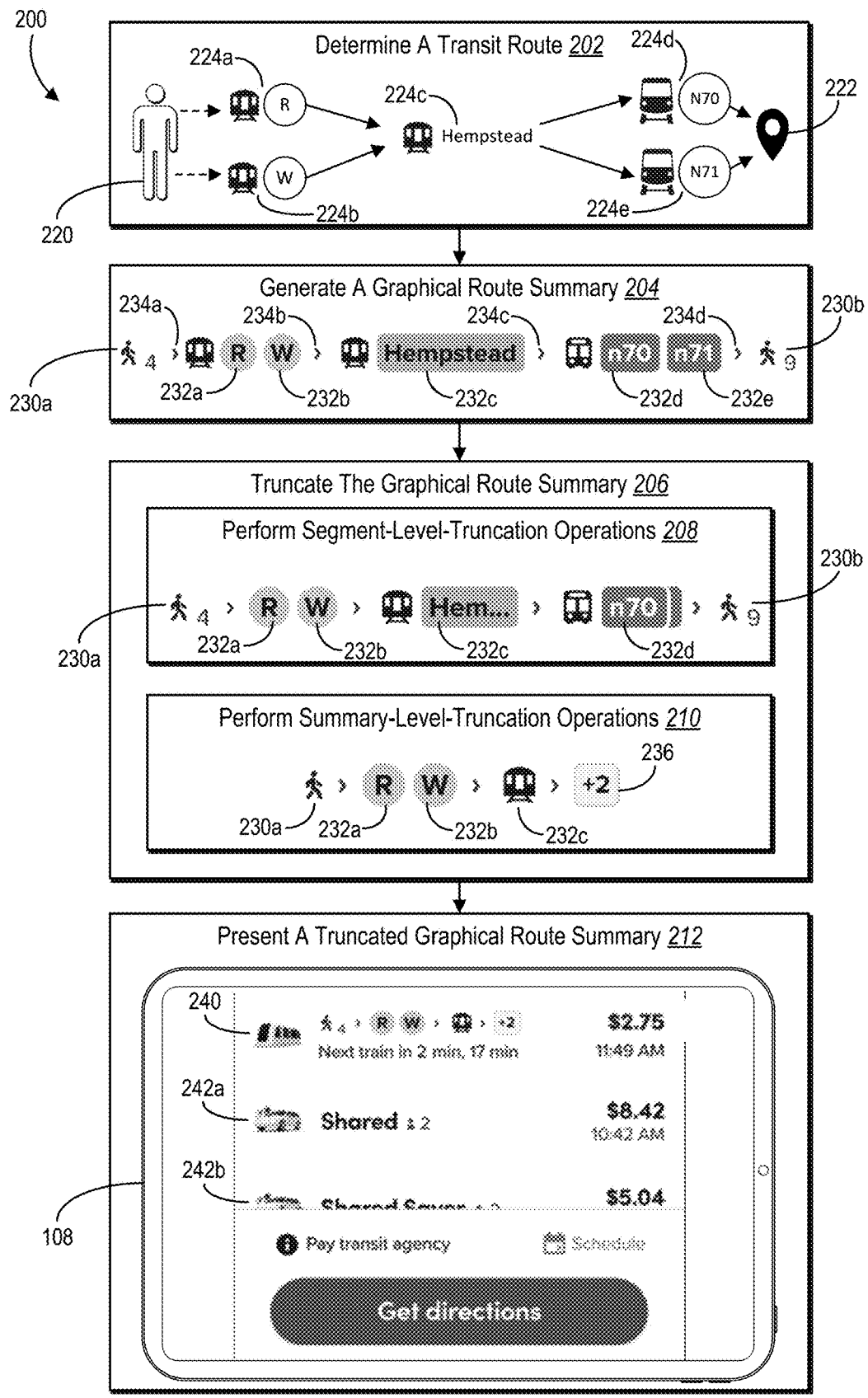
FIG. 2 illustrates an overview of a route-summary-truncation system generating and presenting a truncated graphical route summary for display within a graphical user interface in accordance with one or more embodiments.

In accordance with one or more embodiments, FIG. 2 provides an overview of the route-summary-truncation system 104 generating and presenting a truncated graphical route summary within a graphical user interface in accordance with one or more embodiments. In particular, FIG. 2 illustrates a series of acts 200, including an act 202 of determining a transit route, an act 204 of generating a graphical route summary, an act 206 of truncating the graphical route summary, and an act 212 of presenting a truncated graphical route summary.

As illustrated in FIG. 2, the series of acts 200 includes the act 202 of determining a transit route. In particular, the route-summary-truncation system 104 determines a transit route by which to transport a requestor 220 associated with the requestor device 108 from a starting location to a destination location 222. As part of the act 202, in some cases, the route-summary-truncation system 104 accesses transit information from the public transportation system 112. For example, the route-summary-truncation system 104 accesses schedules for transit vehicles and geographic paths or routes taken by transit vehicles. Additionally, the route-summary-truncation system 104 may access GTFS data including location, speed, and/or bearing information pertaining to the transit vehicles.

As part of the act 202 of determining a transit route, the route-summary-truncation system 104 identifies a starting location and a destination location 222 of the requestor 220. In at least one embodiment, the route-summary-truncation system 104 receives, as input at the requestor device 108, a starting location and the destination location 222. For instance, the route-summary-truncation system 104 can receive GPS coordinates, addresses, location names, or other location identifiers as user input. Additionally, the route-summary-truncation system 104 may analyze location data received from the requestor device 108 to determine a starting location. For example, the route-summary-truncation system 104 may utilize the current location of the requestor device 108 as the starting location.

Based on accessing the public transit information, the destination location 222, and the starting location, the route-summary-truncation system 104 generates one or more predicted transit routes. In particular, the route-summary-truncation system 104 can determine a transit route for one or more transit vehicles to transport the requestor 220 along route segments to the destination location 222. As illustrated in FIG. 2, the route-summary-truncation system 104 determines a transit route including one or more route segments 224a-224e (collectively "route segments 224"). Each of the route segments 224 correspond to a transit vehicle. For example, the route segment 224a corresponds to the "R" train, the route segment 224b corresponds to the "W" train, etc. Although the route-summary-truncation system 104 may itself determine the transit route, in at least one embodiment, the route-summary-truncation system 104 receives data representing some or all of the transit route from the public transportation system 112. For example, in some cases, the route-summary-truncation system 104 may communicate the starting location and the destination location 222 to the public transportation system 112 and receive one or more route segments for the predicted transit route from the public transportation system 112.

As further illustrated in FIG. 2, the route-summary-truncation system 104 can determine a group of alternative route segments within a transit route. A group of alternative route segments comprises two or more route segments each corresponding to a transit vehicle that can transport the requestor 220 along the same portion of the transit route. For example, the route-summary-truncation system 104 determines a group of alternative route segments comprising the route segment 224a and the route segment 224b. As illustrated in FIG. 2, the requestor 220 can ride either the "R" train along the route segment 224a or the "W" train along the route segment 224b for an initial route segment of the transit route. The requestor 220 can travel to the transfer point for the route segment 224c by taking any route segment within the group of alternative route segment. Additionally, as illustrated, the transit route includes a second group of alternative route segments comprising route segment 224d and the route segment 224e.

As illustrated in FIG. 2, the route-summary-truncation system 104 performs the act 204 of generating a graphical route summary. Generally, the route-summary-truncation system 104 generates segment graphics corresponding to the route segments of the transit route. Segment graphics can include icons and other graphical elements that represent route segments of the transit route. For example, as illustrated in FIG. 2, the route-summary-truncation system 104 generates a graphical route summary that includes walking segment graphics 230a and 230b and segment graphics 232a-232e (collectively "segment graphics 232"). Each of the segment graphics 232a-232e correspond to each of the route segments 224a-224e. Additionally, the route-summary-truncation system 104 may utilize icons to indicate transfers between route segments. For instance, the route-summary-truncation system 104 indicates transfers between route segments using carrots 234a-234d. Multiple segment graphics between carrots correspond to route segments within a group of alternative route segments. For example, the segment graphic 232a and the segment graphic 232b correspond to the route segment 224a and the route segment 224b within a group of alternative route segments, respectively.

The route-summary-truncation system 104 may indicate route segment details via the segment graphics. For example, the segment graphics may indicate route segment details including the predicted time of a route segment, the name of a route segment, transit vehicle type, a transit authority, or other details. For instance, the walking segment graphics 230a and 230b indicate a predicted walking time (e.g., 4 minutes or 9 minutes). Additionally, the segment graphics 232 can include a route-segment name (e.g., R, W, Hempstead, n70, n71) as well as transit vehicle type (e.g., train icons, bus icons). FIG. 2 illustrates an example graphical route summary including segment graphics in accordance with one embodiment. In one or more other embodiments, the route-summary-truncation system 104 may represent transit details using different segment graphics. For instance, instead of using an icon indicating the type of transit vehicle, the route-summary-truncation system 104 can indicate the transit vehicle type using different icon colors or shapes (e.g., square icons for buses and circle icons for trains).

As further illustrated in FIG. 2, the route-summary-truncation system 104 performs the act 206 of truncating the graphical route summary. In particular, the route-summary-truncation system 104 may determine that the graphical route summary generated in the act 204 exceeds a threshold size. For instance, the route-summary-truncation system 104 might determine that the graphical route summary cannot fit within a designated area in the graphical user interface of the requestor device 108. Generally, the route-summary-truncation system 104 successively performs truncation operations until the graphical route summary fits within the threshold size. For instance, the route-summary-truncation system 104 can perform the act 206 of truncating the graphical route summary by performing an act 208 of performing segment-level-truncation operations and an act 210 of performing summary-level-truncation operations. The following paragraphs provide additional detail regarding each of the acts 208 and 210.

As mentioned, the route-summary-truncation system 104 may perform the act 208 of performing segment-level-truncation operations. Generally, the route-summary-truncation system 104 identifies segment-level-truncation operations and successively performs them on individual segment graphics of the graphical route summary. In some cases, the route-summary-truncation system 104 iteratively performs a given segment-level-truncation operation on each segment graphic within the graphical route summary—unless the route-summary-truncation system 104 determines not to perform the given segment-level-truncation operation on a particular segment graphic (e.g., because the segment-level-truncation operation would not shorten the graphical route summary). As suggested above, in some embodiments, the route-summary-truncation system 104 may prioritize the full display of initial segment graphics (e.g., the segment graphics 232a and 232b) and perform segment-level-truncation operations initially on terminal segment graphics (e.g., the segment graphics 232d and 232e).

As illustrated in FIG. 2, the route-summary-truncation system 104 performs several segment-level-truncation operations. For example, the route-summary-truncation system 104 performs the segment-level-truncation operation of removing the train icon associated with the segment graphics 232a and 232b. Additionally, the route-summary-truncation system 104 performs the segment-level-truncation operations of removing characters within the route-segment name for the segment graphic 232c (e.g., changing "Hempstead" to "Hem . . . ") and collapsing segment graphics from a group of alternative route segments by overlaying the segment graphic 232*d* over the segment graphic 232*e* FIG. 5 and the corresponding discussion provide additional examples of segment-level-truncation operations and detail relating to segment-level-truncation operations.

Figure 6:
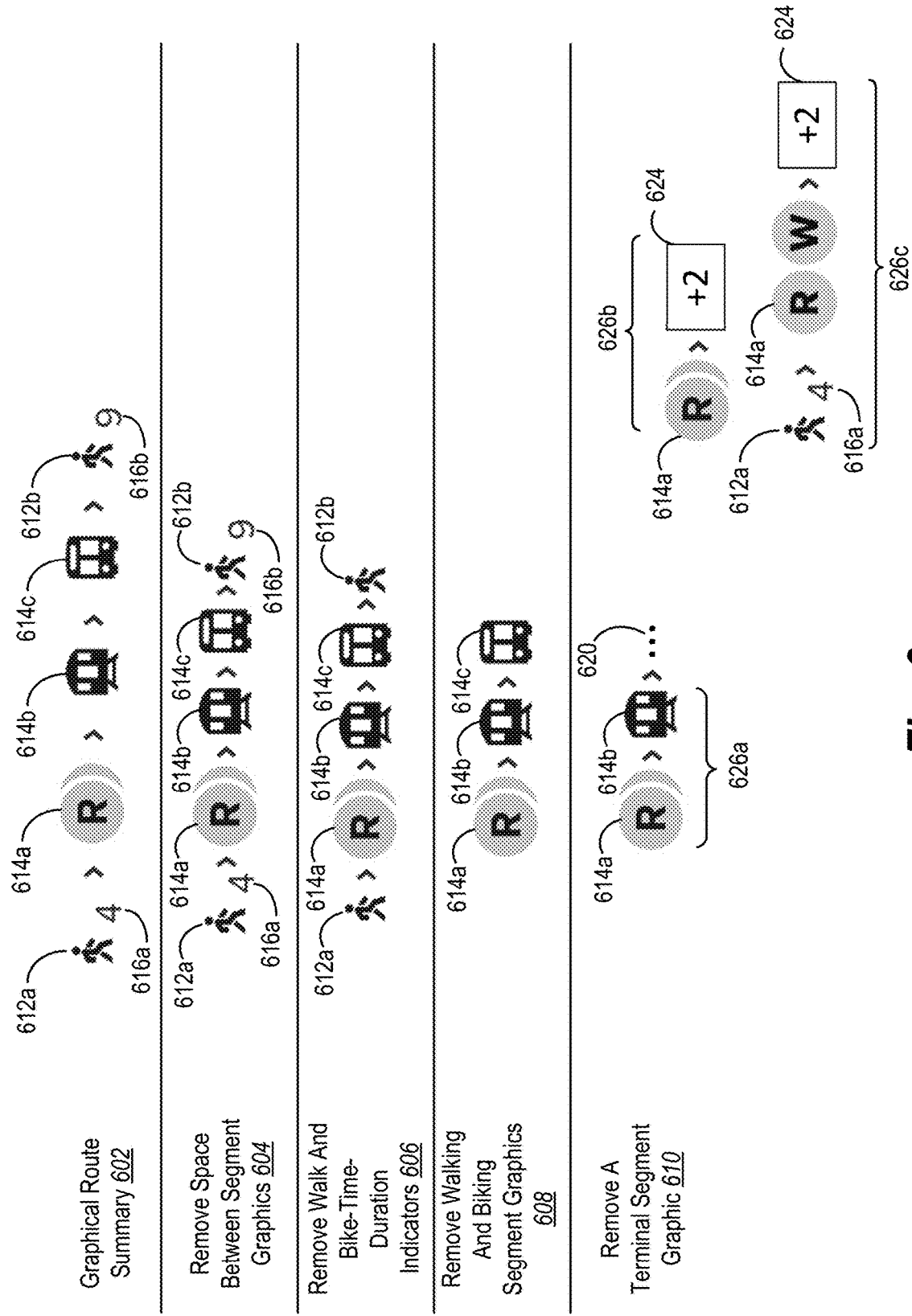
FIG. 6 illustrates the route-summary-truncation system performing a series of example summary-level-truncation operations in accordance with one or more embodiments.

As further illustrated in FIG. 2, the route-summary-truncation system 104 may perform the act 210 of performing summary-level-truncation operations. In contrast to segment-level-truncation operations that apply to individual segment graphics one by one, in some cases, summary-level-truncation operations apply to the graphical route summary as a whole or have a shortening effect on the graphical route summary as a whole. For instance, the route-summary-truncation system 104 removes time-duration indicators for walking segment graphics including the walking segment graphic 230*a*. Additionally, the route-summary-truncation system 104 removed two terminal segment graphics from the graphical route summary and replaced it with a substitute element 236. FIG. 6 and the accompanying discussion provide additional examples of and detail regarding summary-level-truncation operations.

As further illustrated in FIG. 2, the route-summary-truncation system 104 performs the act 212 of presenting a truncated graphical route summary. In particular, after truncating the graphical route summary and determining that the truncated graphical route summary is within a threshold size, the route-summary-truncation system 104 transmits data for truncated graphical route summary 240 for display at the requestor device 108. As illustrated, the route-summary-truncation system 104 presents the truncated graphical route summary 240 with other transit route information including the transit rate (e.g., $2.75), transit duration (e.g., predicted ETA of 11:49 AM), schedule information (e.g., next train), and other information. Additionally, the route-summary-truncation system 104 may present the truncated graphical route summary 240 alongside other transportation options. For example, the route-summary-truncation system 104 transmits provider-vehicle options 242*a* and 242*b* for display on the requestor device 108.

Figure 3A:
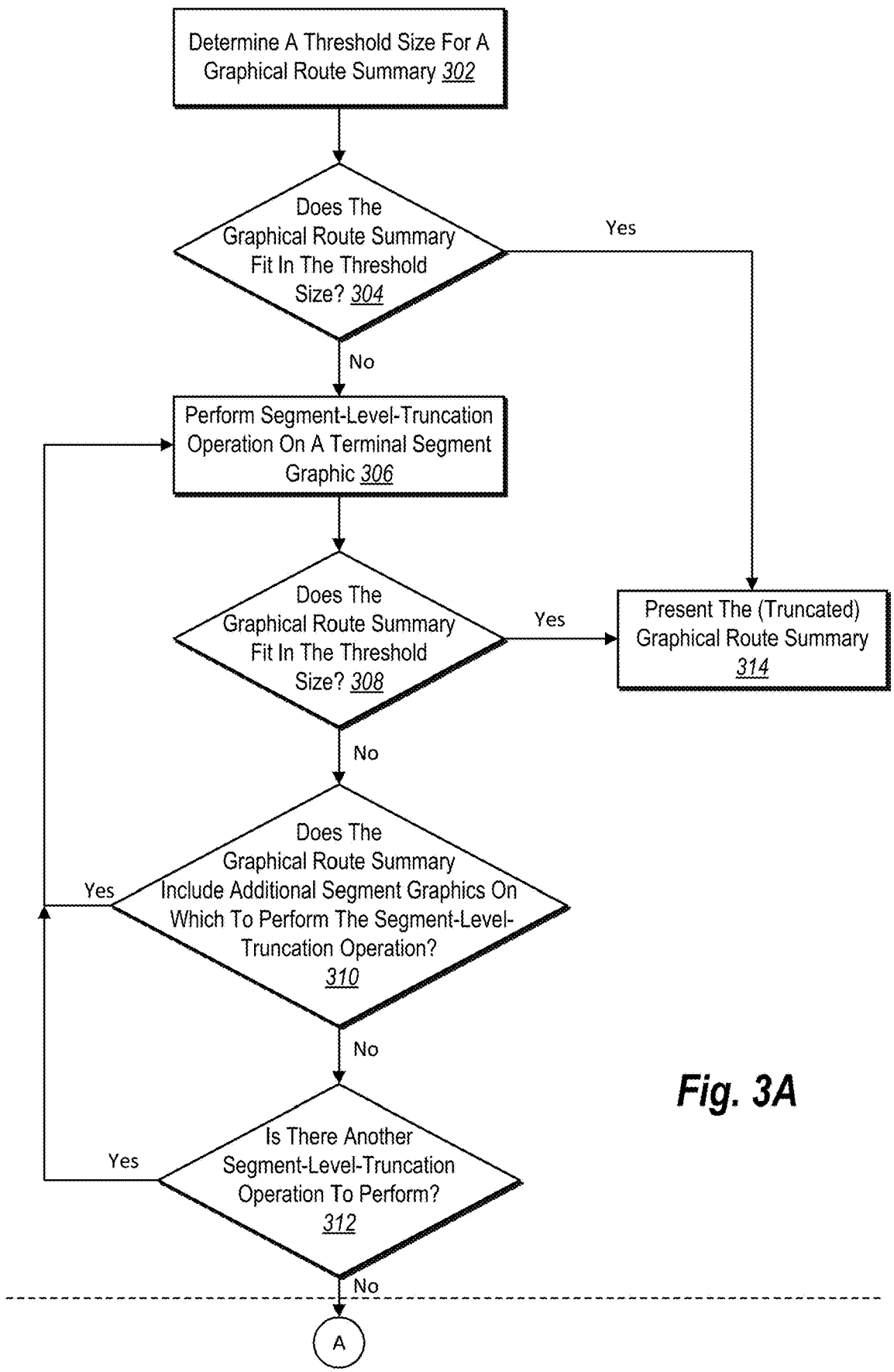
FIGS. 3A-3B illustrate a series of acts by which the route-summary-truncation system evaluates a graphical route summary and performs one or both of segment-level-truncation operations and summary-level-truncation operations in accordance with one or more embodiments.
Figure 3B:
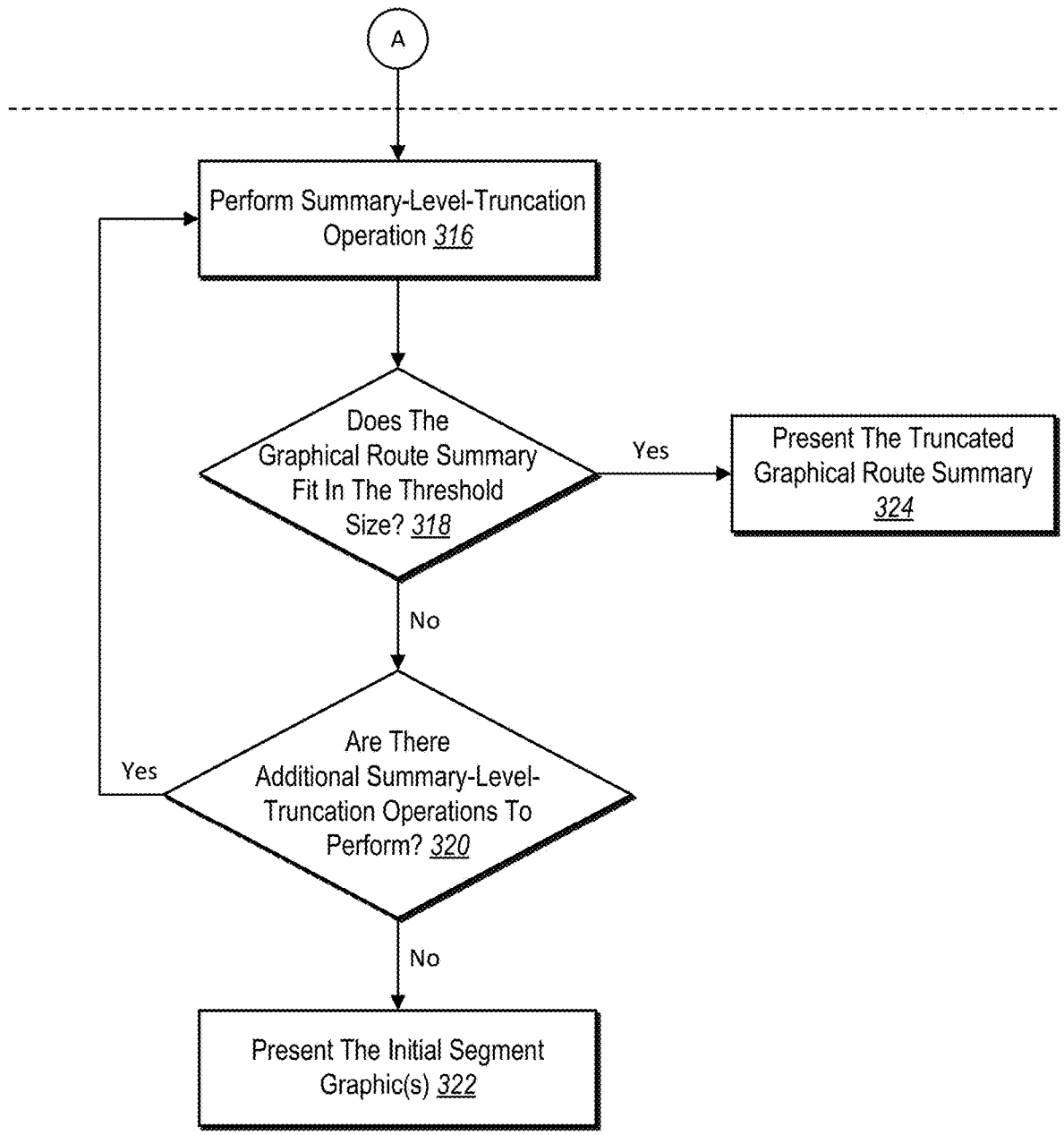

FIG. 2 provides an overview of how the route-summary-truncation system 104 generates and presents a truncated graphical route summary in accordance with one or more embodiments. As mentioned, in some cases, the route-summary-truncation system 104 successively performs segment-level truncation operations and summary-level-truncation operations on the graphical route summary. Generally, the route-summary-truncation system 104 performs a truncation operation, evaluates the size of the graphical route summary, and determines to present the graphical route summary or continue performing truncation operations. FIGS. 3A-3B illustrate a series of acts by which the route-summary-truncation system 104 successively performs segment-level-truncation operations and summary-level-truncation operations in accordance with one or more embodiments.

Figure 4:
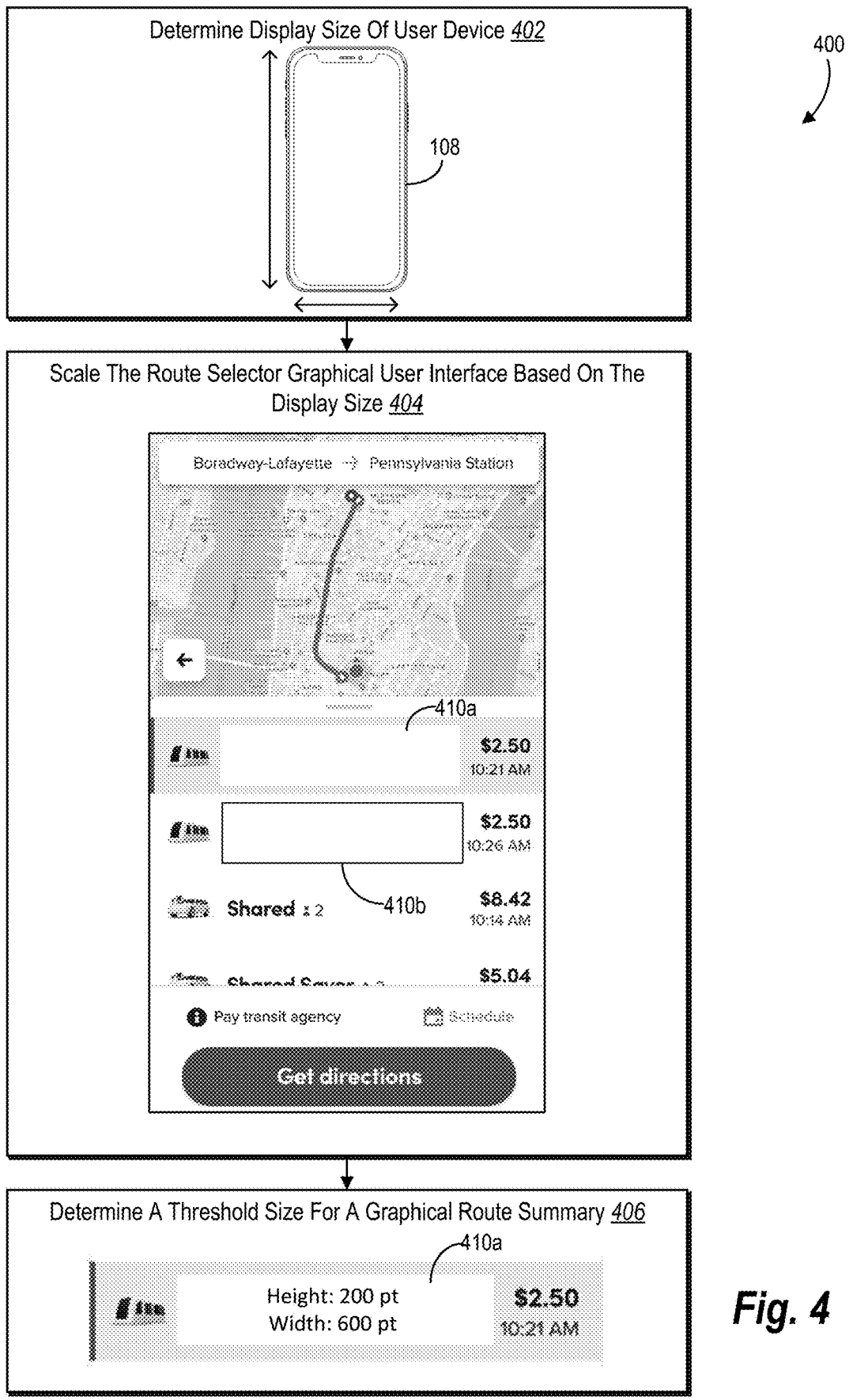
FIG. 4 illustrates an example of the route-summary-truncation system determining a threshold size for a graphical route summary in accordance with one or more embodiments.

In particular, FIG. 3A illustrates a series of acts by which the route-summary-truncation system 104 evaluates a graphical route summary and performs segment-level-truncation operations in accordance with at least one embodiment. As illustrated in FIG. 3A, at act 302, the route-summary-truncation system 104 determines a threshold size for a graphical route summary. Generally, the route-summary-truncation system 104 analyzes information associated with the requestor device 108 to determine a threshold size for the graphical route summary. In some embodiments, the route-summary-truncation system 104 determines that the size of the graphical route summary cannot exceed the threshold size in terms of a graphical user interface or screen. FIG. 4 and the corresponding discussion provide additional detail regarding the act 302 of determining a threshold size for the graphical route summary.

As further illustrated in FIG. 3A, at act 304, the route-summary-truncation system determines whether the graphical route summary fits in the threshold size. In some embodiments, the route-summary-truncation system 104 compares the size of the graphical route summary with the threshold size, such as by comparing the size of the graphical route summary to a threshold size for a graphical user interface or a screen. This disclosure describes further examples of comparison with a threshold size below with reference to FIG. 4. Based on determining that the graphical route summary fits within the threshold size, the route-summary-truncation system 104 proceeds to the act 314 of presenting the graphical route summary. In the act 314, for instance, the route-summary-truncation system 104 presents the graphical route summary for display within a graphical user interface of the requestor device 108.

In contrast, if the route-summary-truncation system 104 determines at the act 304 that the graphical route summary does not fit in the threshold size, the route-summary-truncation system 104 proceeds to act 306 and performs a segment-level-truncation operation on a terminal segment graphic. In some embodiments, the route-summary-truncation system 104 orders segment-level-truncation operations to initially apply to a terminal segment graphic such that the graphical route summary includes un-truncated initial segment graphics that are most temporally relevant to a requestor for completing a transit route. Indeed, the route-summary-truncation system 104 performs segment-level-truncation operations on a terminal segment graphic.

As used herein, the term "terminal segment graphic" refers to the last segment graphic in a series of segment graphics or the last segment graphic representing a vehicle in the series of segment graphics. In particular, a terminal segment graphic refers to the segment graphic closest in order to a destination location in a graphical route summary on which the route-summary-truncation system 104 has not performed a particular segment-level-truncation operation. In some cases, the last segment graphic represents the last or final route segment representing a vehicle in a transit route before a destination location (which may not be shown in the graphical route summary). For example, in some embodiments, the route-summary-truncation system 104 lists the segment graphics from left to right where the leftmost segment graphic represents the first route segment in a transit route. In this example, the terminal segment graphic comprises the rightmost segment graphic on which the route-summary-truncation system 104 has not performed a particular segment-level-truncation operation.

Although FIG. 3A illustrates an embodiment in which the route-summary-truncation system 104 performs segment-level-truncation operations first on a terminal segment graphic and last on an initial segment graphic. In other embodiments, the route-summary-truncation system 104 performs segment-level-truncation operations in a different order. For example, the route-summary-truncation system 104 may, based on location data of the requestor device 108, determine that the user has already completed an initial route segment. The route-summary-truncation system 104 may then prioritize displaying a second route segment and determine to perform segment-level-truncation operations on the second segment graphic last. Accordingly, the route-summary-truncation system 104 may perform truncation operations first on the initial segment graphic corresponding to the completed initial route segment. The route-summary-truncation system 104 may thereafter perform truncation operations on the terminal segment graphic.

As part of the act 306, in some embodiments, the route-summary-truncation system 104 identifies a particular segment-level-truncation operation to perform on the terminal segment graphic. In at least one embodiment, the route-summary-truncation system 104 orders segment-level-truncation operations to apply to segment graphics. For example, the route-summary-truncation system 104 may order the segment-level-truncation operations based on an input logic, user input, local preferences, and/or other methods. The route-summary-truncation system 104 begins by performing a first segment-level-truncation operation on the terminal segment graphic. For instance, in some embodiments, the route-summary-truncation system 104 successively performs segment-level-truncation operations in the following order: removing segment graphics for an alternative route segment in a group of alternative route segments, remove a character within a route-segment name, remove space between segment graphics, collapse segment graphics, and replace a route-segment name with a vehicle icon. For each segment-level-truncation operation, the route-summary-truncation system 104 may iteratively apply the operation (or decide not to apply the operation) on each terminal segment graphic—beginning with a terminal graphic segment.

As illustrated in FIG. 3A, the route-summary-truncation system 104 proceeds to the act 308 and determines whether the graphical route summary fits in the threshold size. As part of the act 308, the route-summary-truncation system 104 compares the graphical route summary that has undergone the segment-level-truncation operation from the previous act (i.e., the act 306) to the threshold size. If the route-summary-truncation system 104 determines that the graphical route summary fits in the threshold size, the route-summary-truncation system 104 proceeds to the act 314 of presenting the truncated graphical route summary.

If the route-summary-truncation system 104 determines that the graphical route summary does not fit in the threshold size, the route-summary-truncation system 104 proceeds to the act 310 and determines whether the graphical route summary includes additional segment graphics on which to perform the segment-level-truncation operation. In particular, the route-summary-truncation system 104 identifies segment graphics within the graphical route summary to which the route-summary-truncation system 104 has not yet applied a particular segment-level-truncation operation. Based on determining that the graphical route summary includes additional segment graphics on which the route-summary-truncation system 104 has not yet performed the particular segment-level-truncation operation, the route-summary-truncation system 104 returns to the act 306 and performs the particular segment-level-truncation operation on the terminal segment graphic. For example, the route-summary-truncation system 104 performs a first segment-level-truncation operation on the last segment graphic and evaluates whether the graphical route summary fits in the threshold size. Based on determining that the graphical route summary does not fit in the threshold size, the route-summary-truncation system 104 performs the same segment-level-truncation operation on the second-to-last segment graphic.

As illustrated by acts 306-310 of FIG. 3A, in some embodiments, the route-summary-truncation system 104 iteratively performs a segment-level truncation operation on segment graphics beginning with the terminal segment graphic. If the route-summary-truncation system 104 determines in the act 310 that the graphical route summary does not include additional segment graphics on which to perform the segment-level-truncation operation, the route-summary-truncation system 104 may proceed to act 312 of determining whether there is another segment-level-truncation operation to perform.

In at least some embodiments, the route-summary-truncation system 104 determines not to perform a given segment-level-truncation operation on a segment graphic. In some cases, the route-summary-truncation system 104 analyzes the segment graphics within the graphical route summary and determines not to perform a truncation operation on a segment graphic based on the segment graphic's characteristics. For instance, in certain implementations, the route-summary-truncation system 104 determines not to perform the segment-level-truncation operation of replacing a segment graphic with a vehicle icon based on determining that the segment graphic already comprises (or is) a vehicle icon. Additionally, the route-summary-truncation system 104 might determine not to perform a given segment-level-truncation operation based determining that the truncation operation would not reduce the size of the graphical route summary. As further examples, the route-summary-truncation system 104 may (i) determine not to remove segment graphics from a group of alternative route segments when a graphical route summary includes no group of alternative route segments or (ii) determine not to remove a character within a route-segment name when a segment graphic has no route-segment name.

As part of the act 312 of determining whether there is another segment-level-truncation operation to perform, the route-summary-truncation system 104 identifies any remaining segment-level-truncation operations. For instance, as previously mentioned, the route-summary-truncation system 104 may access the ordered list of segment-level-truncation operations. Thus, after the route-summary-truncation system 104 has completed the iterative performance of a first segment-level-truncation operation on all segment graphics, the route-summary-truncation system 104 identifies a second segment-level-truncation operation. Upon identifying a segment-level-truncation operation that has not yet been performed on the segment graphics, the route-summary-truncation system 104 returns to the act 306 of performing the segment-level-truncation operation on the terminal segment graphic.

Based on determining in the act 312 that there are no more other segment-level-truncation operations to perform, the route-summary-truncation system 104 begins performing summary-level-truncation operations. As mentioned previously, FIG. 3A illustrates how the route-summary-truncation system 104 successively performs segment-level-truncation operations until the route-summary-truncation system 104 exhausts all segment-level-truncation operations on each of the segment graphics of a graphical route summary. FIG. 3B illustrates an example of how the route-summary-truncation system 104 performs summary-level-truncation operations after performing segment-level-truncation operations. In some cases, the route-summary-truncation system 104 performs summary-level-truncation operations after exhausting segment-level-truncation operations.

FIG. 3B illustrates an example series of acts by which the route-summary-truncation system 104 evaluates the graphical route summary and performs summary-level-truncation operations. In particular, in act 316, the route-summary-truncation system 104 performs a summary-level-truncation operation. In contrast to segment-level-truncation operations that apply to individual graphics sequentially one by one, the route-summary-truncation system 104 performs summary-level-truncation operations on the graphical route summary as a whole or that affect multiple segment graphics within the graphical route summary (e.g., in a non-sequential operation). In particular, the route-summary-truncation system 104 may identify a first summary-level-truncation operation by determining an order of summary-level-truncation operations and perform the first summary-level-truncation operation on the graphical route summary.

For example, in at least one embodiment, the route-summary-truncation system 104 may determine to perform summary-level-truncation operations in the following order: remove space between the segment graphics, remove time-duration indicators for walking segments, remove time-duration indicators for biking segments, remove walking segment graphics, and begin removing terminal segment graphics (if necessary). In other embodiments, the route-summary-truncation system 104 performs summary-level-truncation operations in different orders. FIG. 6 and the corresponding paragraph provide additional detail regarding examples of summary-level-truncation operations.

As further illustrated in FIG. 3B, the route-summary-truncation system 104 proceeds to act 318 of determining whether the graphical route summary fits in the threshold size. Generally, the route-summary-truncation system 104 accesses the threshold size and compares the threshold size to the graphical route summary. Based on determining that the graphical route summary fits within the threshold size, the route-summary-truncation system 104 proceeds to act 324 of presenting the truncated graphical route summary.

As illustrated in FIG. 3B, if the route-summary-truncation system 104 determines, in the act 318, that the graphical route summary does not fit in the threshold size, the route-summary-truncation system 104 proceeds to act 320 of determining whether there are additional summary-level-truncation operations to perform. More specifically, the route-summary-truncation system 104 accesses the ordered list of summary-level-truncation operations. Based on identifying an additional summary-level-truncation operation to perform, the route-summary-truncation system 104 returns to the act 316 and performs the additional summary-level-truncation operation. Thus, the route-summary-truncation system 104 successively performs summary-level-truncation operations.

In at least some embodiments, the route-summary-truncation system 104 determines not to perform a given summary-level-truncation operation on a graphical route summary. In some cases, the route-summary-truncation system 104 analyzes the graphical route summary and determines not to perform a given summary-level-truncation operation on a given set of segment graphics based on the segment graphics' characteristics. For instance, in certain implementations, the route-summary-truncation system 104 determines not to perform the summary-level-truncation operation of removing time-duration indicators when a graphical route summary does not include time-duration indicators. Similarly, in certain implementations, the route-summary-truncation system 104 determines not to perform the summary-level-truncation operation of removing a walking segment graphic or a biking segment graphic when a graphical route summary does not include a walking segment graphic or a biking segment graphic.

As further illustrated in FIG. 3B, if the route-summary-truncation system 104 determines in the act 320 that the summary-level-truncation operations have all been performed and the graphical route summary does not fit within the threshold size, the route-summary-truncation system 104 proceeds to act 322 and presents the initial segment graphic (s) from a graphical route summary. In some cases, the route-summary-truncation system 104 presents, for display within a graphical user interface, a truncated graphical route summary comprising only the initial segment graphic. In one or more embodiments, the route-summary-truncation system 104 presents the initial segment graphic and ellipses or another indicator representing the omitted segment graphics.

FIGS. 3A-3B illustrate an example series of acts in accordance with one or more embodiments. The route-summary-truncation system 104 may perform a different series of acts in evaluating the graphical route summary and performing truncation operations. For example, in at least one embodiment, the route-summary-truncation system 104 does not necessarily exhaust the segment-level-truncation operations before performing summary-level-truncation operations. In one embodiment, for example, the route-summary-truncation system 104 alternates performing segment-level-truncation operations and summary-level-truncation operations.

As mentioned, the route-summary-truncation system 104 determines whether the graphical route summary fits in a threshold size. FIG. 4 presents an example embodiment of determining a threshold size for a graphical route summary. In particular, FIG. 4 illustrates a series of acts 400 including act 402 of determining a display size of a user device, an act 404 of scaling the route selector graphical user interface based on the display size, and an act 406 of determining a threshold size for a graphical route summary. Although the following discussion describes the route-summary-truncation system 104 performing the series of acts 400, in at least one embodiment, the requestor device 108 performs one or more acts in the series of acts 400.

As illustrated in FIG. 4, the series of acts 400 includes the act 402 of determining a display size of a user device. In particular, the route-summary-truncation system 104 detects the screen size of the requestor device 108. For instance, the route-summary-truncation system 104 determines the length, width, and/or diagonal length of the screen of the requestor device 108. As part of the act 402, the route-summary-truncation system 104 may also determine screen resolution or the number of distinguishable pixels displayed in a particular area. In particular, the route-summary-truncation system 104 may detect the pixels per inch ("PPI") of the requestor device 108.

As further illustrated in FIG. 4, the series of acts 400 includes the act 404 of scaling the route selector graphical user interface based on the display size. In particular, the route-summary-truncation system 104 may, based on the detected display size of the user device, determine a size for the route selector graphical user interface. For example, the route-summary-truncation system 104 scales the route selector graphical user interface and its elements to fit the screen of the requestor device 108. As illustrated in FIG. 4, the route selector graphical user interface may include various elements including a map, different transportation options, and a transportation selection option. The route selector graphical user interface also includes summary display area 410a and summary display area 410b. The summary display areas 410a and 410b comprise areas in which the route-summary-truncation system 104 will display corresponding graphical route summaries.

As further shown in FIG. 4, the series of acts 400 includes the act 406 of determining a threshold size for a graphical route summary. After scaling the route selector graphical user interface, the route-summary-truncation system 104 isolates and measures the summary display areas 410*a* and 410*b*. For example, as illustrated in FIG. 4, the route-summary-truncation system 104 determines the point (i.e., "pt") height and width of the summary display area 410*a*. In other embodiments, the route-summary-truncation system 104 may also determine the area and/or perimeter of the summary display areas 410*a*-410*b*. Additionally, the route-summary-truncation system 104 may measure the threshold size using different units, such as pixels. The route-summary-truncation system 104 designates the determined size of the summary display area 410*a* as the threshold size for the corresponding graphical route summary.

Figure 5:
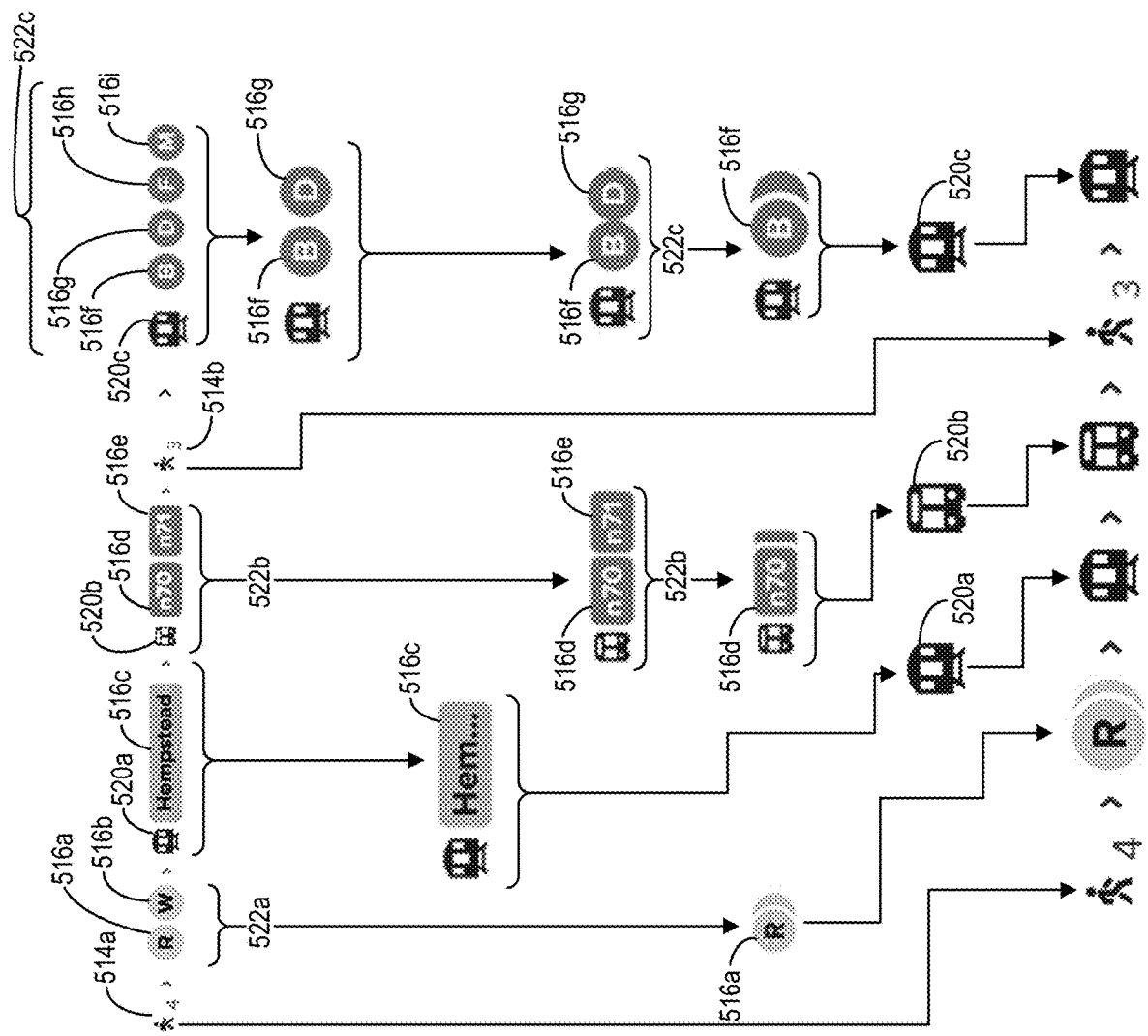
FIG. 5 illustrates the route-summary-truncation system performing a series of example segment-level-truncation operations in accordance with one or more embodiments.

As mentioned, based on comparing the graphical route summary with the determined threshold size, the route-summary-truncation system 104 may perform segment-level-truncation operations and/or summary-level-truncation operations. FIGS. 5-6 and their accompanying discussion provide examples of truncation operations. FIG. 5 illustrates and provides detail regarding example segment-level-truncation operations. FIG. 6 provides additional detail regarding example summary-level-truncation operations.

As indicated above, FIG. 5 illustrates various segment-level-truncation operations that the route-summary-truncation system 104 may perform on a graphical route summary 502 containing walking segment graphics 514*a*-514*b* and segment graphics 516*a*-516*i*. In at least one embodiment, the route-summary-truncation system 104 performs segment-level-truncation operations 504-512 illustrated in FIG. 5 in a particular order. For example, in some cases, the route-summary-truncation system 104 begins by performing the segment-level-truncation operation 504 of removing segment graphics from a group of alternative route segments and (after additional segment-level-truncation operations) performs the segment-level-truncation operation 512 of replacing a route-segment name with a vehicle icon last. Although FIG. 5 illustrates a particular order of segment-level-truncation operations, the route-summary-truncation system 104 may perform the segment-level-truncation operations in any order. Additionally, the route-summary-truncation system 104 may perform a number of segment-level-truncation operations not illustrated in FIG. 5.

As suggested above, in some embodiments, the route-summary-truncation system 104 successively performs the segment-level-truncation operations 504-512. In particular, the route-summary-truncation system 104 performs a single segment-level-truncation operation—or a single iteration of a segment-level-truncation operation—then determines whether the graphical route summary 502 fits within a threshold size. In a given iteration, for example, the route-summary-truncation system 104 performs a first segment-level-truncation operation on a single segment graphic, determines the graphical route summary 502 does not fit within a threshold size, and performs the first segment-level-truncation operation on another segment graphic—until performing (or determining not to perform) the first segment-level-truncation operation on each segment graphic within the graphical route summary 502. Additionally, in at least one embodiment, the route-summary-truncation system 104 performs the segment-level-truncation operations 504-512 first on a terminal segment graphic and finally on an initial segment graphic.

As shown in FIG. 5, the route-summary-truncation system 104 may perform the segment-level-truncation operation 504 of removing segment graphics from a group of alternative route segments. In particular, the route-summary-truncation system 104 analyzes the number of segment graphics in each group of alternative route segments. Based on determining that the number of segment graphics in a group of alternative route segments exceeds a maximum number of route segments, the route-summary-truncation system 104 removes segment graphics. As illustrated, the route-summary-truncation system 104 identifies groups of alternative route segments 522*a*, 522*b*, and 522*c*. The route-summary-truncation system 104 determines that the route segments within the group of alternative route segments 522*c* exceeds a maximum number of two route segments. Based on this determination, the route-summary-truncation system 104 removes the segment graphics 516*h* and 516*i* from the group of alternative route segments 522*c*. As illustrated, the truncated group of alternative route segments 522*c* includes only the segment graphics 516*f* and 516*g*. In contrast to the group of alternative route segments 522*c*, the route-summary-truncation system 104 determines not to perform the segment-level-truncation operation 504 on groups of alternative route segments 522*a* and 522*b*—because both groups do not exceed the maximum number of two route segments.

In some embodiments, as part of the segment-level-truncation operation 504 of removing segment graphics from a group of alternative route segments, the route-summary-truncation system 104 adjusts the maximum number of route segments. In particular, the route-summary-truncation system 104 determines the maximum number of route segments based on the length of the route-segment names. For longer route-segment names that occupy more space, the route-summary-truncation system 104 may determine a lower maximum number of route segments per group of alternative route segments. For instance, the route-summary-truncation system 104 limits route-segment names that include 3 characters or more to a maximum number of three route segments. The route-summary-truncation system 104 may also determine the maximum number of five and four route segments for route-segment names comprising one character and two characters, respectively.

As further illustrated in FIG. 5, the route-summary-truncation system 104 may perform the segment-level-truncation operation 506 of removing a character within a route-segment name. For instance, the route-summary-truncation system 104 shortens a route-segment name from a segment graphic by incrementally removing individual characters from the route-segment name. In some cases, the route-summary-truncation system 104 removes one character and checks whether the graphical route summary 502 is within the threshold size. The route-summary-truncation system 104 continues to remove characters until the graphical route summary 502 meets the threshold size or until the route-summary name meets a character minimum. In particular, the route-summary-truncation system 104 determines a character minimum at which the route-summary-truncation system 104 stops removing characters. In one embodiment, the route-summary-truncation system 104 determines that the character minimum equals three characters.

The route-summary-truncation system 104 may determine not to perform the segment-level-truncation operation 506 on a given route-segment name based on characteristics of the route-segment. For instance, the route-summary-truncation system 104 may determine that removing characters would not reduce the size of the segment graphic or that removing characters would remove critical information. For example, in some cases, the route-summary-truncation system 104 determines not to shorten the segment graphics 516*d* and 516*e* because shortening "n70" or "n71" to "n . . . " removes critical information.

In at least one embodiment, the route-summary-truncation system 104 replaces the omitted characters with ellipses or another indication of omitted characters. For example, as illustrated in FIG. 5, the route-summary-truncation system 104 performs the segment-level-truncation operation 506 on the segment graphic 516*c*. The route-summary-truncation system 104 successively removes characters from the route-segment name of the segment graphic 516*c*, "Hempstead," until the route-segment name meets the three-character minimum "Hem . . . "

Additionally, or alternatively, in at least one embodiment, the route-summary-truncation system 104 performs the segment-level-truncation operation 506 of removing a character within a route-segment name by incrementally reducing the segment graphic width. While in some embodiments, the route-summary-truncation system 104 successively removes characters from within route-segment names, the route-summary-truncation system 104 may also incrementally reduce the segment graphic width and remove characters as necessary. For example, the route-summary-truncation system 104 may determine to reduce the width of a segment graphic two points (pt) at a time. The route-summary-truncation system 104 removes a character within the route-segment name when the character no longer fits within the shortened segment graphic. For example, the route-summary-truncation system 104 may not remove the character "d" within the route-segment name "Hempstead" until the second or third iteration of reducing the width of the segment graphic 516*c* by two-point increments. The route-summary-truncation system 104 may use both methods of directly removing a character within a route-segment name and reducing the width of the segment graphic. For instance, the route-summary-truncation system 104 may utilize the first method on Android user devices and utilize the second method in iOS user devices.

FIG. 5 also illustrates the segment-level-truncation operation 508 of removing space between segment graphics. For instance, the route-summary-truncation system 104 removes space between a segment graphic and an additional segment graphic within a group of alternative route segments. As shown in FIG. 5, the route-summary-truncation system 104 identifies the groups of alternative route segments 522*b* and 522*c*. The route-summary-truncation system 104 reduces or removes space between each of the segment graphics in the groups of alternative route segments. In one embodiment, the route-summary-truncation system 104 determines a maximum spacing distance (e.g., 2 pixels) between segment graphics. As illustrated, the route-summary-truncation system 104 reduces space between the segment graphics 516*d* and 516*e* and also between the segment graphics 516*f* and 516*g*.

As indicated above, in some cases, the route-summary-truncation system 104 determines to not perform the segment-level-truncation operation 508 on particular segment graphics. For instance, the route-summary-truncation system 104 might determine that removing space between segment graphics will not reduce the size of the graphical route summary or that removing the space will cause confusion.

As further illustrated in FIG. 5, the route-summary-truncation system 104 performs segment-level-truncation operation 510 of collapsing segment graphics. In some embodiments, the route-summary-truncation system 104 collapses segment graphics within a group of alternative route segments by overlaying a segment graphic over additional segment graphic(s). As illustrated, the route-summary-truncation system 104 identifies the groups of alternative route segments 522*a*-522*c*. For the group of alternative route segments 522*a*, the route-summary-truncation system 104 overlays the segment graphic 516*a* over the segment graphic 516*b*. Likewise, the route-summary-truncation system 104 collapses the segment graphics 516*d*-516*e* and the segment graphics 516*f*-516*g*. As mentioned previously, in some embodiments, the route-summary-truncation system 104 performs the segment-level-truncation operation 510 first on terminal segment graphics, such as by initially performing the segment-level-truncation operation 510 on the group of alternative route segments 522*c* before the group of alternative route segments 522*b* and 522*a*.

As indicated above, in some embodiments, the route-summary-truncation system 104 determines to not perform the segment-level-truncation operation 510 on certain segment graphics. For instance, the route-summary-truncation system 104 might determine that segment graphics within the group of alternative route segments are significantly different. For instance, the segment graphics might correspond to different types of transit vehicles (e.g., a bus and a train) or belong to different transit systems (e.g., transit authorities).

In addition (or in the alternative) to the segment-level-truncation operations 504-510, in some cases, the route-summary-truncation system 104 performs the segment-level-truncation operation 512 of replacing a route-segment name with a vehicle icon. As illustrated in FIG. 5, the graphical route summary 502 includes vehicle icons 520*a*, 520*b*, and -520*c*. When performing the segment-level-truncation operation 512, the route-summary-truncation system 104 replaces segment graphics with vehicle icons. The vehicle icons indicate the transit vehicle types corresponding to the route segments. For example, the vehicle icons may indicate a bus (e.g., the vehicle icon 520*b*), a train (e.g., the vehicle icon 520*c*), or any other type of transit vehicle. As illustrated, the route-summary-truncation system 104 replaces the segment graphic 516*d* with the vehicle icon 520*b*. The route-summary-truncation system 104 also replaces the segment graphic 516*f* with the vehicle icon 520*c*.

As further indicated above, in some cases, the route-summary-truncation system 104 determines to not perform the segment-level-truncation operation 512 on particular segment graphics. For instance, the route-summary-truncation system 104 might determine that a segment graphic already comprises a sole vehicle icon or that replacing the route-segment name with the vehicle icon would not reduce the size of the graphical route summary.

As further shown in FIG. 5, in some embodiments, the route-summary-truncation system 104 generates truncated graphical route summary 524 by performing the segment-level-truncation operations 502-512. By performing iterations of the segment-level-truncation operations 502-512, the route-summary-truncation system 104 generates the graphical route summary 524. As previously discussed, if the route-summary-truncation system 104 determines, at any iteration, that the graphical route summary fits within the threshold size, the route-summary-truncation system 104 may present the graphical route summary at the user device. However, in some cases, the route-summary-truncation system 104 determines that the truncated graphical route summary 524 does not fit within the threshold size. Based on this determination, in certain implementations, the route-summary-truncation system 104 performs summary-level-truncation operations.

FIG. 6 illustrates the route-summary-truncation system 104 performing a set of summary-level-truncation operations in accordance with one or more embodiments. As depicted, the route-summary-truncation system 104 performs summary-level-truncation operations 604-610 on a graphical route summary 602 as a whole. In particular, in contrast to segment-level-truncation operations that apply to individual segment graphics sequentially (e.g., from the terminal segment graphic to the initial segment graphic), the route-summary-truncation system 104 performs the summary-level-truncation operations to the entire graphical route summary 602. In at least one embodiment, the graphical route summary 602 comprises a graphical route summary on which the route-summary-truncation system 104 has previously performed segment-level-truncation operations. For example, the graphical route summary 602 can comprise or constitute the truncated graphical route summary 524, as illustrated above in FIG. 5, as a starting point.

As illustrated, the route-summary-truncation system 104 performs the summary-level-truncation operation 604 of removing space between segment graphics. In particular, the summary-level-truncation operation removes or reduces space between all of the segment graphics in the graphical route summary 602. For example, the route-summary-truncation system 104 reduces spaces between walking segment graphics 612a-612b and segment graphics 614a-614c. In some embodiments, the route-summary-truncation system 104 determines a maximum space width and reduces the space between the segment graphics 614a-614c and the walking segment graphics 612a-612b to meet the maximum space width.

As further shown in FIG. 6, the route-summary-truncation system 104 may also perform the summary-level-truncation operation 606 of removing walk-time-duration indicators and bike time-duration indicators. For example, the graphical route summary 602 includes time-duration indicators 616a and 616b. The time-duration indicators 616a and 616b indicate the anticipated time required to complete the walking segment of the route segment. As depicted, the time-duration indicators 616a and 616b are located in proximity to the walking segment graphics 612a and 612b, respectively. As part of performing the summary-level-truncation operation 606, the route-summary-truncation system 104 removes the time-duration indicators 616a and 616b and reduces the space between the walking segment graphics 612a and 612b and neighboring segment graphics. Though not illustrated, the route-summary-truncation system 104 may also remove bike-time-duration indicators associated with biking segment graphics (e.g., a bike icon).

As further illustrated in FIG. 6, the route-summary-truncation system 104 also performs the summary-level-truncation operation 608 of removing walking and biking segment graphics. When performing summary-level-truncation operations, the route-summary-truncation system 104 may remove segment graphics corresponding to route segments that do not involve scheduled transit vehicles. For example, the route-summary-truncation system 104 removes the walking segment graphics 612a and 612b from the graphical route summary. Though not illustrated, the route-summary-truncation system 104 may also remove biking segment graphics, scooter segment graphics, or other segment graphics.

In addition (or in the alternative) to the summary-level-truncation operations 604, 606, and 608, the route-summary-truncation system 104 may perform the summary-level-truncation operation 610 of removing a terminal segment graphic. In particular, the route-summary-truncation system 104 may iteratively remove terminal segment graphics until the truncated graphical route summary fits within the threshold size. For example, the route-summary-truncation system 104 removes the segment graphic 614c based on determining that the segment graphic 614c is a terminal segment graphic. Based on determining that the truncated graphical route summary still does not fit within the threshold size, the route-summary-truncation system 104 may also remove the segment graphic 614b. Furthermore, and as illustrated in FIG. 6, the route-summary-truncation system 104 may insert ellipses or otherwise indicate the removed segment graphic(s). For example, the route-summary-truncation system 104 may insert ellipses 620 and/or omitted segment graphic element 624 indicating the number of removed segment graphics (e.g., 2 removed segment graphics).

As indicated above, the route-summary-truncation system 104 may perform all or a combination of the summary-level-truncation operations 604-610 to generate truncated graphical route summaries. FIG. 6 illustrates example truncated graphical route summaries 626a, 626b, and 626c. The route-summary-truncation system 104 generates the truncated graphical route summary 626a and the truncated graphical route summary 626b based on performing all of the summary-level-truncation operations 604-610. In other embodiments, the route-summary-truncation system 104 may emphasize initial segment graphics and selectively perform summary-level-truncation operations on terminal segment graphics. For example, when generating the truncated graphical route summary 626c, the route-summary-truncation system 104 did not perform the summary-level-truncation operations 604 and 606 to the walking segment graphic 612a or the time-duration indicator 616a.

Figure 7:
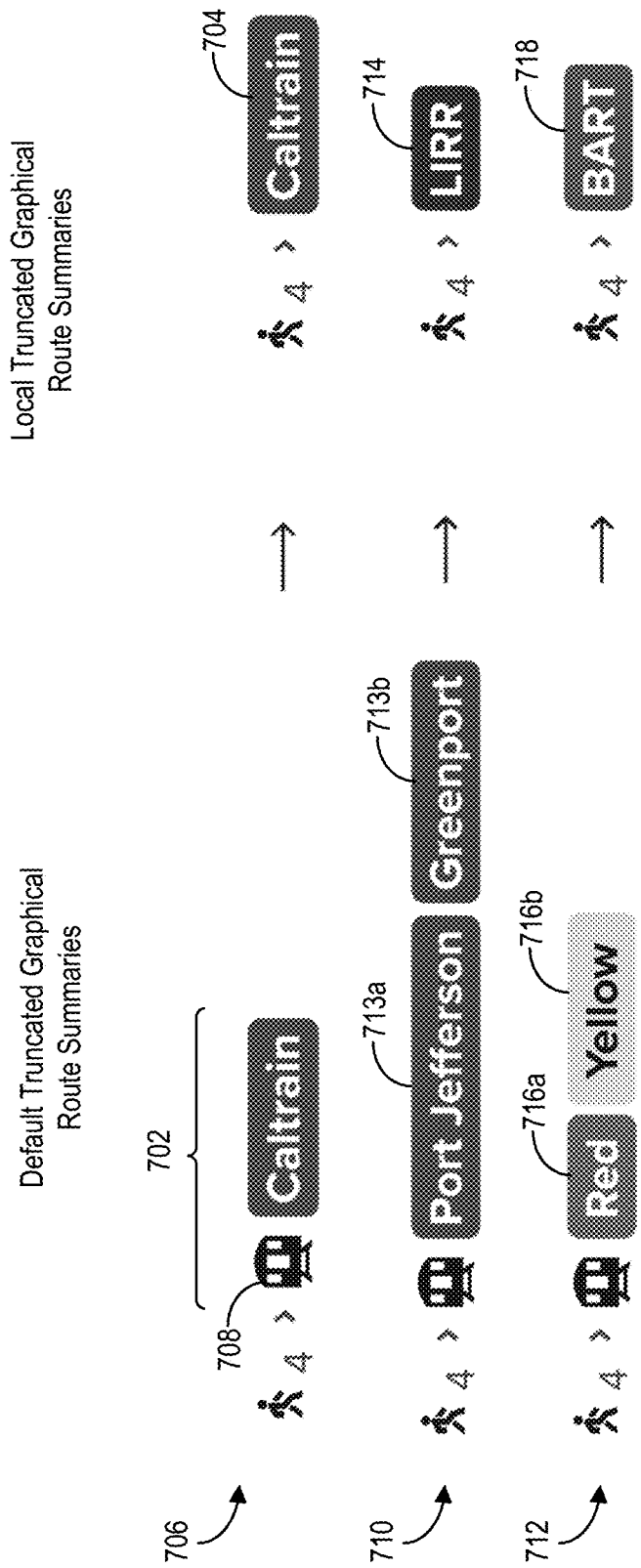
FIG. 7 illustrates the route-summary-truncation system generating example segment graphics in accordance with one or more embodiments.

FIGS. 5-6 illustrate various examples of segment-level-truncation operations and summary-level-truncation operations. Generally, the route-summary-truncation system 104 may apply the segment-level-truncation operations or the summary-level-truncation operations described above to various graphical route summaries. Additionally, the route-summary-truncation system 104 may localize truncation operations. More specifically, the route-summary-truncation system 104 may truncate a graphical route summary by using local segment graphics within the truncated graphical route summary. FIG. 7 illustrates example local segment graphics in accordance with one or more embodiments.

Generally, FIG. 7 depicts comparisons between default truncated graphical route summaries and local truncated graphical route summaries. In some embodiments, the route-summary-truncation system 104 presents truncated graphical route summaries based on a predicted level of familiarity. In particular, the route-summary-truncation system 104 removes or alters graphical route summaries based on predicting route segments with which a user is already familiar. For example, based on predicting that a user is familiar with a route segment of a transit route, the route-summary-truncation system 104 may truncate the graphical route summary by removing an obvious or unnecessary portion of a segment graphic.

In some embodiments, the route-summary-truncation system 104 predicts user familiarity based on geographic area. The route-summary-truncation system 104 might predict that users within a geographic area are familiar with transit options in the area. For instance, in some embodiments, the route-summary-truncation system 104 determines that users within New York City can distinguish route icons for subway lines (e.g., numbers or letters in circles) from bus route icons/names (e.g., "B1-B92," "Q1-Q114"). Thus, the route-summary-truncation system 104 truncate graphical route summaries by utilizing local segment graphics within truncated graphical route summaries.

For example, in certain implementations, the route-summary-truncation system 104 determines that a route segment corresponds to a geographic region. In one embodiment, the route-summary-truncation system 104 analyzes individual route segments within a transit route to determine locations of each of the transit routes or portions of the transit routes. Additionally or alternatively, the route-summary-truncation system 104 may determine a location based on the geographic regions of the starting and destination locations. Based on its analysis, the route-summary-truncation system 104 determines that a route segment corresponds to a geographic region. As illustrated in FIG. 7, for instance, the route-summary-truncation system 104 determines that the route segment involving the Caltrain corresponds to the geographic region of San Francisco.

As illustrated in FIG. 7, the route-summary-truncation system 104 may generate a local segment graphic by removing a vehicle icon. In particular, based on determining that users within a specific geographic region can infer the transit vehicle type based on the route-segment name, the route-summary-truncation system 104 may generate a local segment graphic that omits a vehicle icon. For instance, as illustrated in example 706 of FIG. 7A, the route-summary-truncation system 104 presents a local segment graphic 704 instead of a default segment graphic 702. The local segment graphic 704 excludes a vehicle icon 708 from the default segment graphic 702.

As further illustrated in FIG. 7, the route-summary-truncation system 104 may identify and use a local segment graphic corresponding to a local transit vehicle system. In particular, when the route-summary-truncation system 104 determines a group of alternative route segments, the route-summary-truncation system 104 may identify a local segment graphic that represents all of the alternative route segments within the group of alternative route segments. For instance, the local segment graphic might comprise a logo, icon, or name of the transit network or system that includes the route segments. Thus, the route-summary-truncation system 104 may merge the group of alternative route segments by presenting a single local segment graphic that represents all of the alternative route segments.

For example, as illustrated by example 710 of FIG. 7, the route-summary-truncation system 104 utilizes a local segment graphic 714 that indicates that alternative route segments (represented by both a vehicle icon and train-line-segment graphics 713a and 713b) are both within the Long Island Rail Road (LIRR) transit network. Additionally, the route-summary-truncation system 104 may utilize transit network icons, logos, or other identifiers as local segment graphics. For example, as illustrated by example 712, the route-summary-truncation system 104 determines that both alternative route segments (represented by a vehicle icon and train-line-segment graphics 716a and 716b) involve transit vehicles within the Bay Area Rapid Transit (BART) transit network. Thus, the route-summary-truncation system 104 presents a local segment graphic 718—instead of the vehicle icon and the train-line-segment graphics 716a and 716b. In at least one other embodiment, instead of the local segment graphic 718, the route-summary-truncation system 104 utilizes the BART logo or symbol.

Similar to the examples above, the route-summary-truncation system 104 may identify, as the local segment graphic, an identifier corresponding to a transit district or authority that manages a transit system (e.g., MTA for the Metropolitan Transit Authority of New York or CTA for the Chicago Transit Authority). For instance, the route-summary-truncation system 104 may determine to present a local segment graphic comprising a transit authority name, icon, or other identifier. In particular, the route-summary-truncation system 104 may use, as a local segment graphic, an MTA logo indicating that alternative route segments are within the transit system operated by the MTA.

Furthermore, in some embodiments, the route-summary-truncation system 104 may further personalize truncated route summaries to individual users. In particular, the route-summary-truncation system 104 may determine route segments with which an individual user is familiar, selectively perform truncation operations, and present a personal truncated graphical route summary. The route-summary-truncation system 104 may determine route segments with which an individual user is familiar (or simply "familiar route segments") based on historical data. More specifically, the route-summary-truncation system 104 may, in accordance with privacy settings set by the user, access historical transportation requests and/or selected transportation options.

In one embodiment, the route-summary-truncation system 104 determines that the user is familiar with a route segment based on the user selecting transit routes involving the route segment a threshold number of times. Based on determining that a user is familiar with a route segment, the route-summary-truncation system 104 may generate a personal truncated graphical route summary. For instance, in some embodiments, the route-summary-truncation system 104 may use a personalized indicator to indicate a typical transit route routinely taken by the user.

To personalize a graphical route summary, the route-summary-truncation system 104 may selectively apply segment-level-truncation operations and/or summary-level-truncation operations based on determined familiar route segments. In particular, the route-summary-truncation system 104 reduces the space occupied by segment graphics corresponding to familiar route segments. The route-summary-truncation system 104 may begin by successively performing segment-level-truncation operations on segment graphics corresponding familiar route segments. For instance, the route-summary-truncation system 104 may remove characters within a route-segment name of a familiar route segment before removing characters within a terminal route-segment name. Additionally, the route-summary-truncation system 104 may selectively perform summary-level-truncation operations. For example, the route-summary-truncation system 104 may remove segment graphics corresponding to familiar route segments before removing terminal segment graphics.

Figure 8A:
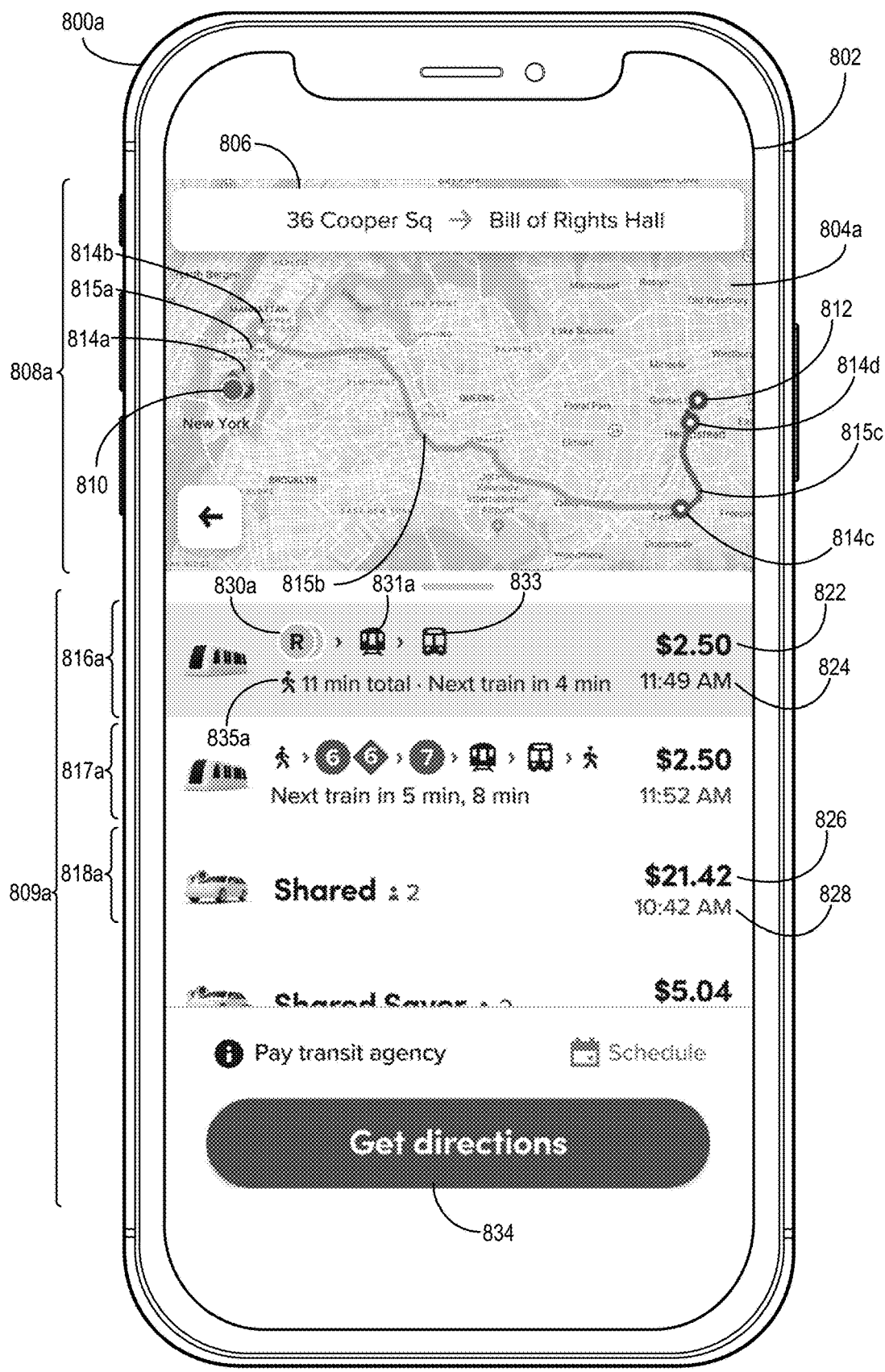
FIGS. 8A-8B illustrate a computing device presenting graphical user interfaces comprising truncated graphical route summaries in accordance with one or more embodiments.
Figure 8B:
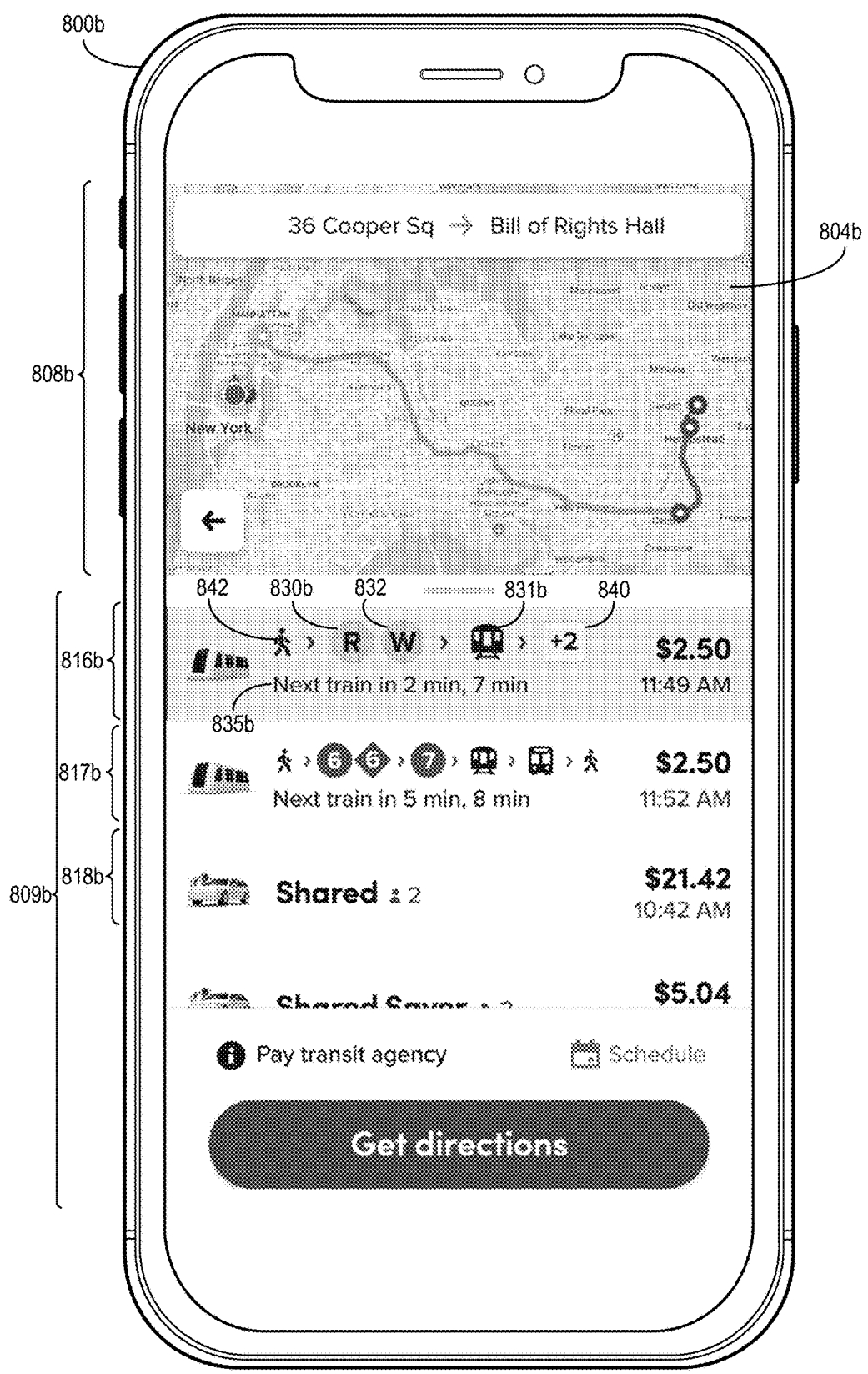

As previously mentioned, in some embodiments, the route-summary-truncation system 104 presents the truncated graphical route summary for display within a graphical user interface. In at least one embodiment, the route-summary-truncation system 104 presents the truncated graphical route summary within a route selector graphical user interface. FIGS. 8A-8B illustrate a series of example route selector graphical user interfaces in accordance with one or more embodiments. In particular, FIG. 8A illustrates a route selector graphical user interface 804a display a truncated graphical route summary. Based on detecting user selection of a segment graphic, the user device may update the truncated graphical route summary. For example, FIG. 8B illustrates an updated graphical route summary within route selector graphical user interface based on user selection of a segment graphic.

FIG. 8A illustrates the user device 800*a* displaying the route selector graphical user interface 804*a* on a screen 802. The route selector graphical user interface 804*a* includes a map portion 808*a* and a route selector portion 809*a*. The route selector graphical user interface 804*a* includes, within the route selector portion 809*a*, various transportation options including transit options 816*a* and 817*a* and a provider vehicle option 818*a*. Generally, the route selector graphical user interface 804*a* efficiently presents information relevant to a user. In particular, the route selector graphical user interface 804*a* includes graphical route summaries that display relevant information. Furthermore, based on user interactions with various elements within the route selector graphical user interface 804*a*, the user device 800*a* may efficiently update the graphical user interface to present desired information.

As illustrated in FIG. 8A, the route selector graphical user interface 804*a* includes the map portion 808*a*. The user device 800*a* displays map information for a selected transportation option within the map portion 808*a*. For example, the user device 800*a* highlights or otherwise visually indicates the transit option 816*a* as selected (e.g., based on a user selection of the transit option 816*a*). Accordingly, the map portion 808*a* includes information for the transit option 816*a*. The map portion 808*a* includes various elements. In particular, the map portion 808*a* includes a request information element 806, a user location indicator 810*a*, transfer location indicators 814*a*-814*d*, and a destination location indicator 812. The following paragraphs provide additional detail regarding each of these elements.

As shown in FIG. 8A, the map portion 808*a* includes the request information element 806. The request information element 806 indicates a starting location (e.g., "36 Cooper Sq") and the input destination location (e.g., "Bill of Rights Hall"). Based on detecting a user interaction with the request information element 806, the user device 800*a* may update the route selector graphical user interface 804*a* to receive input of a different starting location and/or a different destination location.

As illustrated in FIG. 8A, the map portion 808*a* also includes the user location indicator 810. The user location indicator 810 corresponds to the detected location of the user device 800*a*. The user device 800*a* may update the map portion 808*a* in real time (or near-real time) to indicate the current location of the user device 800*a*. For example, as the user device 800*a* travels along a transit route, the user device 800*a* updates the location of the user location indicator 810.

The map portion 808*a* illustrated in FIG. 8A also includes the transfer location indicators 814*a*-814*d*. In particular, the transfer location indicators 814*a*-814*d* indicate the transfer locations within a selected transportation option. Transfer locations comprise geographic areas where the user either enters a new transit vehicle, transfers between transit vehicles, or exits a transit vehicle to complete a transit route. As illustrated, the transfer location indicators 814*a*-814*d* indicate transfer locations for the transit option 816*a*.

As further illustrated in FIG. 8A, the transfer location indicators 814*a*-814*d* are connected by route segment indicators 815*a*-815*c*. For example, the route segment indicators 815*a*-815*c* represent the predicted path that a transit vehicle will take between transfer points. Each of the route segment indicators 815*a*-815*c* corresponds to a route segment within the selected transportation option. For instance, the route segment indicator 815*a* represents the predicted route corresponding to segment graphic 830*a*.

In at least one embodiment, the user device 800*a* visually indicates a route segment indicator of the route segment indicators 815*a*-815*c* based on detected user selection of the corresponding segment graphic in the transit option 816*a*. Based on detected user selection of the segment graphic 830*a*, in some cases, the user device 800*a* highlights or otherwise visually indicates the route segment indicator 815*a*. For example, the user device 800*a* may cause the route segment indicator 815*a* to change colors, flash, or otherwise draw the user's attention. Similarly, the user device 800*a* may highlight or otherwise visually indicate segment graphics based on detecting user interaction with one of the route segment indicators 815*a*-815*c*. For instance, based on detecting user interaction with the route segment indicator 815*b*, the route selector graphical user interface 804*a* may color code, highlight, or otherwise visually indicate segment graphic 831*a* corresponding to the route segment indicator 815*b*.

Though not illustrated in FIG. 8A, the user device 800*a* may update the map portion 808*a* to include information concerning selected provider vehicle options. For instance, based on detecting a user selection of the provider vehicle option 818*a*, the user device 800*a* updates the map portion 808*a* to include a provider vehicle location icon, a pickup location indicator, a destination location indicator, or the predicted route from the pickup location to the destination location.

As illustrated in FIG. 8A, the route selector graphical user interface 804*a* further includes the route selector portion 809*a*. Generally, the route selector portion 809*a* includes various transportation options and related information. More specifically, the route selector portion 809*a* includes information that compares features of multiple transportation options. For example, the route selector portion 809*a* includes the transit options 816*a* and 817*a* and the provider vehicle option 818*a* along with pricing and scheduling information.

As mentioned, the route selector portion 809*a* in FIG. 8A includes the transit option 816*a* and the transit option 817*a*. The route selector portion 809*a* includes information relating to each of the various transit options to offer a comparison of various features of the transit options. For instance, the transit option 816*a* includes a truncated graphical route summary indicating the complexity of the transit option 816*a*. The truncated graphical route summary of the transit option 816*a* includes segment graphics 830*a*, 831*a*, and 833. Additionally, the transit option 816*a* includes a transit rate 822, a transit estimated time of arrival 824, and additional information 835*a*. Although the following paragraphs provide more detail with relation to the transit option 816*a*, the following discussion is equally applicable to elements within the transit option 817*a*.

As illustrated in FIG. 8A, the transit option 816*a* includes the truncated graphical route summary including the segment graphics 830*a*, 831*a*, and 833. Based on a user interaction with the segment graphics within the truncated graphical route summary, the user device 800*a* may update the route selector graphical user interface 804*a* to include the original (i.e., untruncated) segment graphics where possible. For instance, in some cases, the user device 800*a* overlays the segment graphic 830*a* on an additional segment graphic(s) and indicates a group of alternative route segments. Based on a user selection of the segment graphic 830*a*, the user device 800*a* may display the additional segment graphic(s). Additionally, based on a user selection of the segment graphic 831*a* or the segment graphic 833, the user device 800*a* may include the removed route-segment names. As described below, FIG. 8B illustrates an example graphical user interface displaying the original segment graphics.

FIG. 8A also includes additional information 835a within the transit option 816a. The additional information 835a includes information relevant to the transit option 816a. In particular, the additional information 835a includes information related to segment graphics shortened, omitted, or otherwise altered by the truncation operations. For example, the additional information 835a includes walking segment information—in part because the walking segment graphic has been removed from the corresponding truncated graphical route summary. Furthermore, the additional information 835a includes scheduling information for the selected transit option. For instance, the additional information indicates when the next train will arrive. The route-summary-truncation system 104 dynamically adjusts information included in the additional information 835a based on information displayed by the truncated graphical route summary.

As further shown in FIG. 8A, the route selector portion 809a also includes the provider vehicle option 818a. The provider vehicle option 818a includes information relevant to a provider vehicle. For instance, the provider vehicle option 818a includes a provider vehicle rate 826, a provider vehicle estimated time of arrival 828, the provider vehicle type (e.g., a shared ride), the number of passengers allowed (e.g., 2), and other relevant information.

Based on detecting a user selection of direction element 834, the user device 800a displays transit route information. In particular, the user device 800a presents information required by the user to complete the transit route. Though not illustrated, the user device 800a may present a detailed map and detailed instructions regarding each route segment within a transit route. Additionally, the user device 800a may present transit rates associated with each route segment within a transit route.

As mentioned previously, based on user selection of a segment graphic of a truncated graphical route summary, in some embodiments, the user device 800a displays some original or un-truncated segment graphics. For instance, based on detecting a user selection of the segment graphic 830a, the user device 800a presents segment graphics omitted or modified by truncation operations. FIG. 8B illustrates a route selector graphical user interface 804b including original segment graphics on a user device 800b. As illustrated, the route selector graphical user interface 804b includes a map portion 808b and a route selector portion 809b including transit options 816b and 817b and a provider vehicle option 818b.

As illustrated in FIG. 8B, the transit option 816b includes the truncated graphical route summary—including segment graphics 830b and 831b, additional segment graphic 832, and omitted segment graphics element 840. The user device 800b effectively reverses truncation operations performed on the segment graphic 830b by displaying the additional segment graphic 832, which was previously hidden. After reversing the truncation operation on the segment graphic 830b and the additional segment graphic 832, the route-summary-truncation system 104 determines whether the updated graphical route summary fits within the threshold size. The route-summary-truncation system 104 may perform additional truncation operations after reversing previously-performed truncation operations. For example, as illustrated in FIG. 8B, the transit option 816b includes the omitted segment graphics element 840 based on omitting additional segment graphics.

As further illustrated in FIG. 8B, the user device 800b updates additional information 835b based on changes made to the truncated graphical route summary. For example, the user device 800b may replace a walking segment graphic 842 in the updated graphical route summary. Based on including the walking segment graphic 842 in the updated graphical route summary, the user device 800b excludes walking route information from the additional information 835b.

Figure 9:
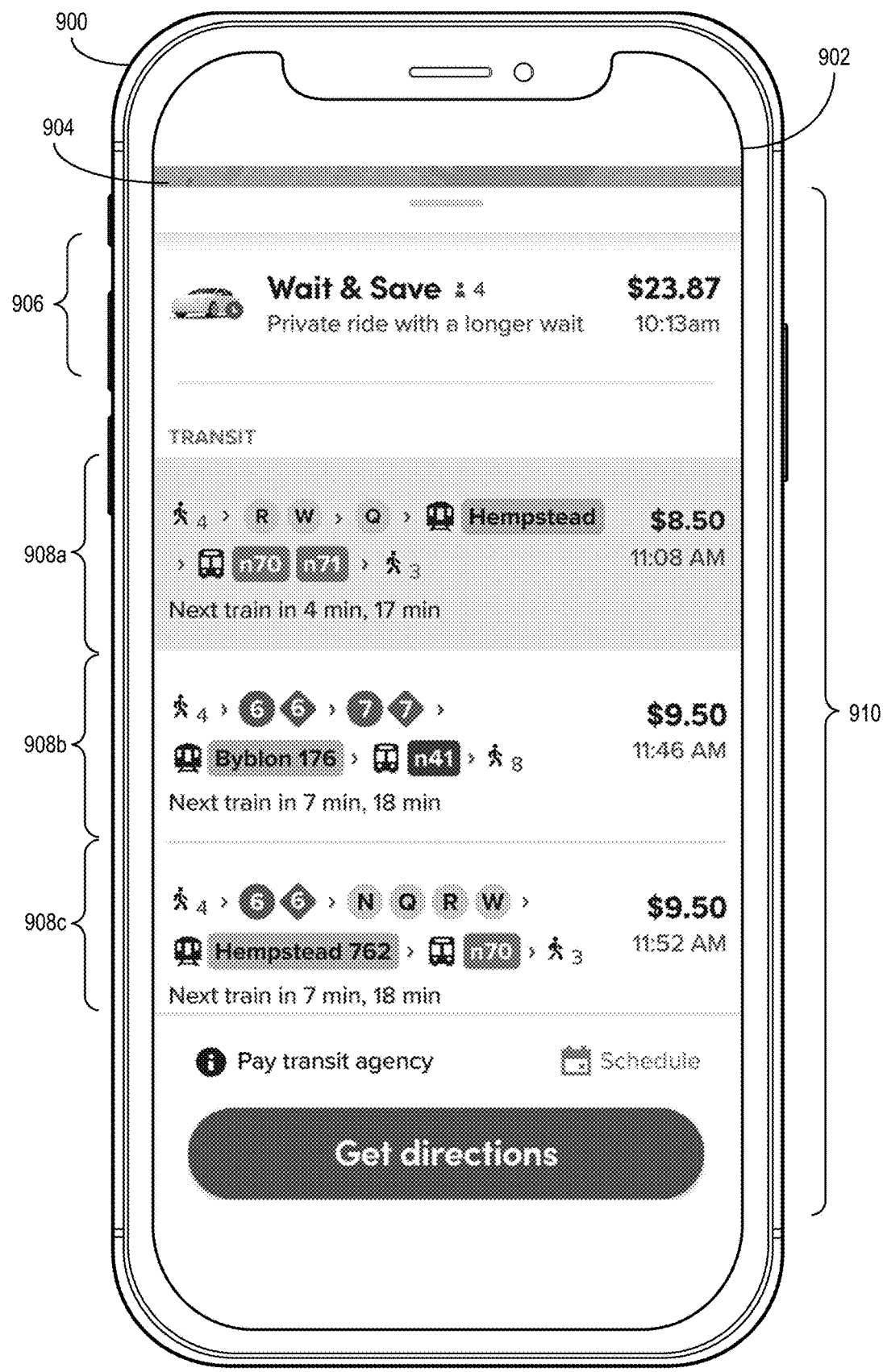
FIG. 9 illustrates a computing device presenting a graphical user interface comprising graphical route summaries in accordance with one or more embodiments.

As indicated above, in some embodiments, a user device expands a route selector portion from a graphical user interface (e.g., route selector portions 809a and 809b of FIGS. 8A and 8B). For example, based on detecting a user motion (e.g., a dragging touch gesture upward) or a selection of the route selector portions 809a or 809b, the user device 800a or 800b may update the graphical user interface to minimize the map portions 808a and 808b. FIG. 9 illustrates a user device 900 presenting a route selector graphical user interface 904 at a screen 902, including an expanded route selector portion 910. The expanded route selector portion 910 includes a provider vehicle option 906 and transit options 908a-908c. As illustrated by FIG. 9, the user device 900 presents graphical route summaries within the expanded route selector portion 910. In particular, the user device 900 presents graphical route summaries in the expanded route selector portion 910 that have not been truncated.

The route-summary-truncation system 104 may determine to display untruncated graphical route summaries in additional circumstances. For example, based on detecting a horizontal orientation of the user device 900, the user device 900 may present untruncated graphical route summaries. Furthermore, the user device 900 may present untruncated graphical route summaries based on a user selection of a particular transit option. For example, based on detecting a user tapping and holding the transit option 908a, the user device 900 may present a window including an untruncated representation of the transit option 908a. Furthermore, the route-summary-truncation system 104 may present an untruncated graphical route summary based on detecting that the user device 900 is currently traveling along the corresponding transit route. For example, based on location data combined with transit route data, the user device 900 can predict that the user is traveling along a particular transit route. The user device 900 may then present the untruncated graphical route summary or present untruncated segment graphics.

Figure 10:
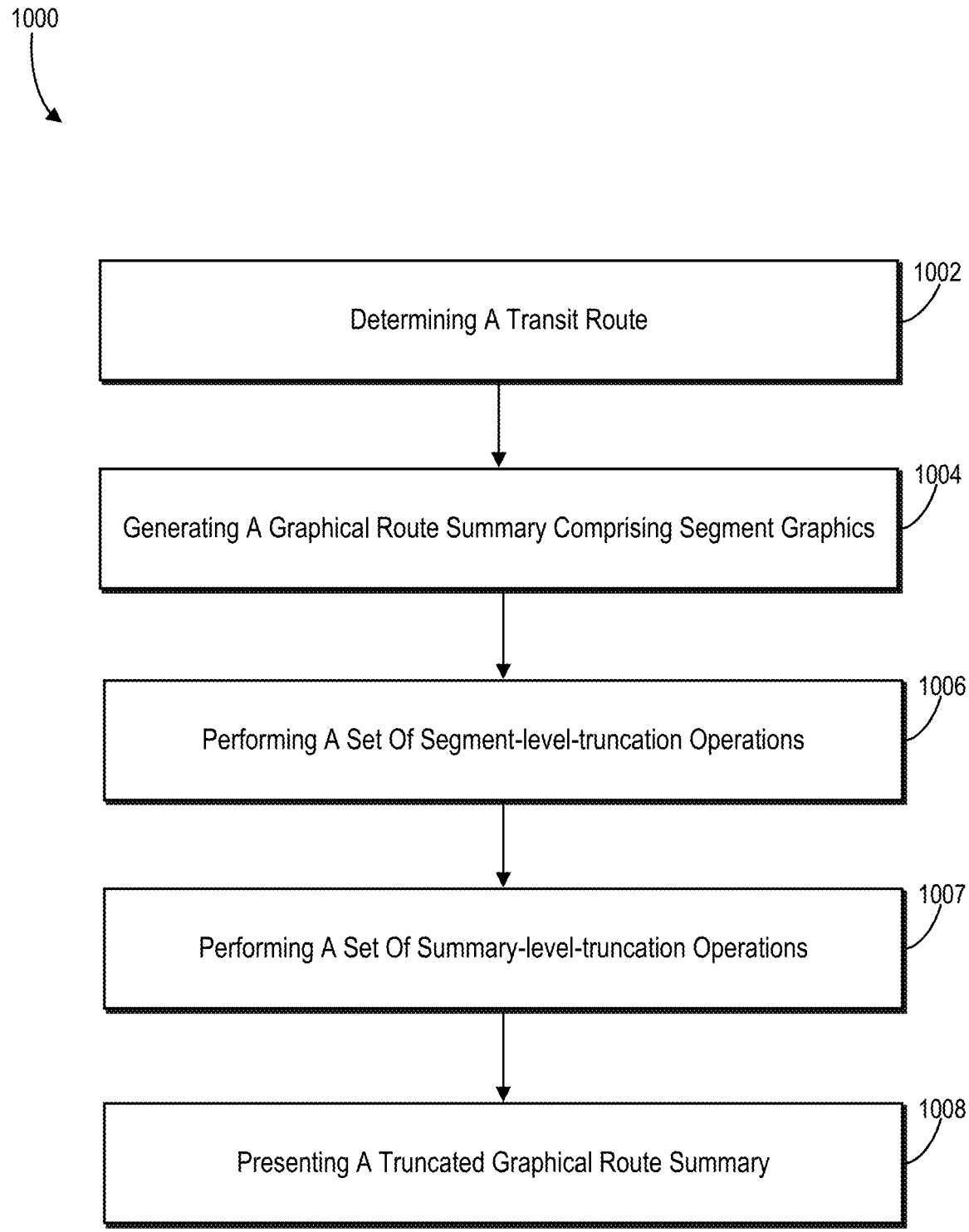
FIG. 10 illustrates a flowchart of a series of acts in a method of generating and truncating a graphical route summary and presenting a truncated graphical route summary in accordance with one or more embodiments.

FIGS. 1-9, the corresponding text, and the examples provide several different systems, methods, techniques, components, and/or devices of the route-summary-truncation system 104 in accordance with one or more embodiments. In addition to the above descriptions, one or more embodiments can also be described in terms of flowcharts including acts for accomplishing a particular result. For example, FIG. 10 illustrates a flowchart of an example sequence of acts in accordance with one or more embodiments. In addition, the acts illustrated in FIG. 10 may be performed with more or fewer acts. Further, the acts may be performed in different orders. The acts described herein may be repeated or performed in parallel with one another or in parallel with different instances of the same or similar acts. The acts of FIG. 10 can be performed as part of a method. Alternatively, a non-transitory computer readable storage medium can comprise instructions that, when executed by one or more processors, cause a computing device to perform the acts depicted in FIG. 10. In still further embodiments, a system comprising one or more memory devices and one or more server devices can perform the acts of FIG. 10.

To illustrate, FIG. 10 includes a flowchart of a series of acts 1000 of generating and presenting a truncated graphical route summary. As shown, the series of acts 1000 includes an act 1002 of determining a transit route. In particular, the act 1002 comprises determining a transit route comprising route segments to a destination location and utilizing one or more transit vehicles.

The series of acts 1000 further includes an act 1004 of generating a graphical route summary comprising segment graphics. In particular, the act 1004 comprises generating a graphical route summary comprising segment graphics for the route segments of the transit route.

As shown in FIG. 10, the series of acts 1000 includes an act 1006 of performing a set of segment-level-truncation operations. In particular, the act 1006 comprises performing a set of segment-level-truncation operations on the segment graphics from the graphical route summary. The act 1006 may comprise performing a segment-level-truncation operation on a first segment graphic from the segment graphics; determining that the graphical route summary is not within a threshold size for the graphical user interface; and performing the segment-level-truncation operation on a second segment graphic from the segment graphics. In at least one embodiment, the set of segment-level truncation operations comprises removing a character within a route-segment name from a segment graphic within the graphical route summary. Additionally, or alternatively, in at least one embodiment, the set of segment-level truncation operations comprises replacing a route-segment name of the segment graphic with a vehicle icon.

The act 1006 can include performing the set of segment-level truncation operations on the segment graphics by performing a segment-level-truncation operation on a terminal segment graphic from the segment graphics until at least one of determining the graphical route summary is within a threshold size for the graphical user interface or exhausting the set of segment-level-truncation operations.

Furthermore, the act 1006 can include performing a first segment-level-truncation operation on a segment graphic from the segment graphics; determining that the graphical route summary exceeds a threshold size for the graphical user interface; and performing a second segment-level-truncation operation on the segment graphic from the segment graphics.

The act 1006 may also include performing a first segment-level-truncation operation on a segment graphic from the segment graphics; determining that the graphical route summary exceeds a threshold size for the graphical user interface; and performing a second segment-level-truncation operation on the segment graphic from the segment graphics.

The series of acts 1000 further includes an act 1007 of performing a set of summary-level-truncation operations. In particular, the act 1007 comprises performing a set of summary-level-truncation operations on the graphical route summary. Additionally, or alternatively, the act 1007 may include performing the set of segment-level-truncation operations on the segment graphics by: performing a segment-level-truncation operation on a first segment graphic from the segment graphics; and determining not to perform the segment-level-truncation operation on a second segment graphic from the segment graphics.

In at least one embodiment, the act 1007 includes performing the set of summary-level-truncation operations comprises: performing a first summary-level-truncation operation on the graphical route summary; determining that the graphical route summary exceeds a threshold size for the graphical user interface; and performing a second summary-level-truncation operation on the graphical route summary. Further, in some embodiments, the act 1007 may include performing a first summary-level-truncation operation on the graphical route summary; determining that the graphical route summary is within a threshold size for the graphical user interface; and determining not to perform a second summary-level-truncation operation.

In one or more embodiments, the set of summary-level-truncation operations comprises at least one of: removing space between the segment graphics from the graphical route summary; removing a time-duration indicator for a walking segment graphic or a biking segment graphic from the graphical route summary; removing the biking segment graphic from the graphical route summary; removing a terminal segment graphic of the segment graphics from the graphical route summary; or removing the walking segment graphic from the graphical route summary.

As further shown in FIG. 10, the series of acts 1000 includes an act 1008 of presenting a truncated graphical route summary. In particular, the act 1008 comprises presenting, for display within a graphical user interface, a truncated graphical route summary based on the set of segment-level-truncation operations and the set of summary-level-truncation operations.

The series of acts 1000 may include determining the transit route comprises a group of alternative route segments; generating the graphical route summary by identifying segment graphics for alternative route segments within the group of alternative route segments; and performing a segment-level-truncation operation from the set of segment-level-truncation operations by: shortening a route-segment name from a segment graphic for an alternative route segment from the alternative route segments; removing the segment graphic for the alternative route segment when the group of alternative route segments exceeds a maximum number of route segments; removing between the segment graphic and an additional segment graphic for an additional alternative route segment within the group of alternative route segments; collapsing the segment graphic and the additional segment graphic by overlaying the segment graphic over the additional segment graphic; or replacing the segment graphic with a vehicle icon.

Furthermore, the series of acts 1000 may include determining that a route segment from the route segments corresponds to a geographic region; identifying a local segment graphic for the route segment based on determining the route segment corresponds to the geographic region; and truncating the graphical route summary by depicting the route segment with the local segment graphic within the truncated graphical route summary.

The series of acts 1000 may include determining the route segments comprise a biking segment or a walking segment; and performing the set of summary-level-truncation operations by removing a time-duration indicator for a biking segment graphic corresponding to the biking segment or a walking segment graphic corresponding to the walking segment.

The components of the route-summary-truncation system 104 can include software, hardware, or both. For example, the components of the route-summary-truncation system 104 can include one or more instructions stored on a computer-readable storage medium and executable by processors of one or more computing devices (e.g., the computing device 1100). When executed by the one or more processors, the computer-executable instructions of the route-summary-truncation system 104 can cause the computing device 1100 to perform the methods described herein. Alternatively, the components of the route-summary-truncation system 104 can comprise hardware, such as a special purpose processing device to perform a certain function or group of functions. Additionally or alternatively, the components of the route-summary-truncation system 104 can include a combination of computer-executable instructions and hardware.

Furthermore, the components of the route-summary-truncation system 104 performing the functions described herein may, for example, be implemented as part of a stand-alone application, as a module of an application, as a plug-in for applications including content management applications, as a library function or functions that may be called by other applications, and/or as a cloud-computing model. Thus, the components of the route-summary-truncation system 104 may be implemented as part of a stand-alone application on a personal computing device or a mobile device. Alternatively or additionally, the components of the route-summary-truncation system 104 may be implemented in any application that allows creation and delivery of marketing content to users, including, but not limited to, various applications.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
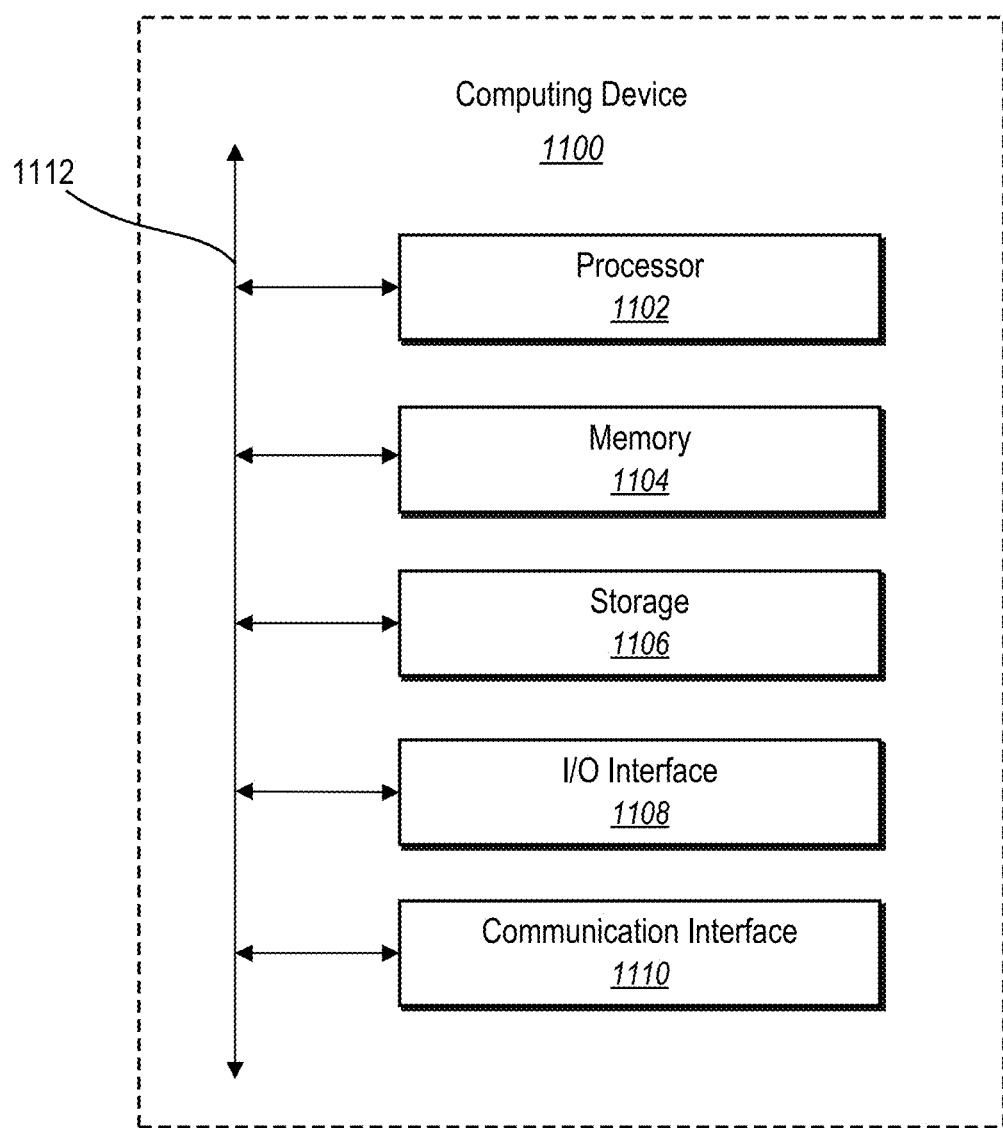
FIG. 11 illustrates a block diagram of an example computing device in accordance with one or more embodiments.

FIG. 11 illustrates, in block diagram form, an exemplary computing device 1100 (e.g., the server(s) 106, the provider device 126, and/or the requestor device 108) that may be configured to perform one or more of the processes described above. One will appreciate that the route-summary-truncation system 104 can comprise implementations of the computing device 1100, including, but not limited to, the requestor device 108, the provider device 126, and/or the server(s) 106. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, the processor 1102 includes hardware for executing instructions, such as those making up a computer program. As an example, and not by way of limitation, to execute instructions, the processor 1102 may retrieve (or fetch) the instructions from an internal register, an internal cache, memory 1104, or a storage device 1106 and decode and execute them.

The computing device 1100 includes memory 1104, which is coupled to the processor 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive ("HDD"), flash memory, a Universal Serial Bus ("USB") drive or a combination of these or other storage devices.

The computing device 1100 also includes one or more input or output interface 1108 (or "I/O interface 1108"), which are provided to allow a user (e.g., requestor or provider) to provide input to (such as user strokes), receive output from, and otherwise transfer data to and from the computing device 1100. The I/O interface 1108 may include a mouse, keypad or a keyboard, a touch screen, camera, optical scanner, network interface, modem, other known I/O devices or a combination of such. The touch screen may be activated with a stylus or a finger.

The I/O interface 1108 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can comprise hardware, software, or both that connects components of computing device 1100 to each other.

Figure 12:
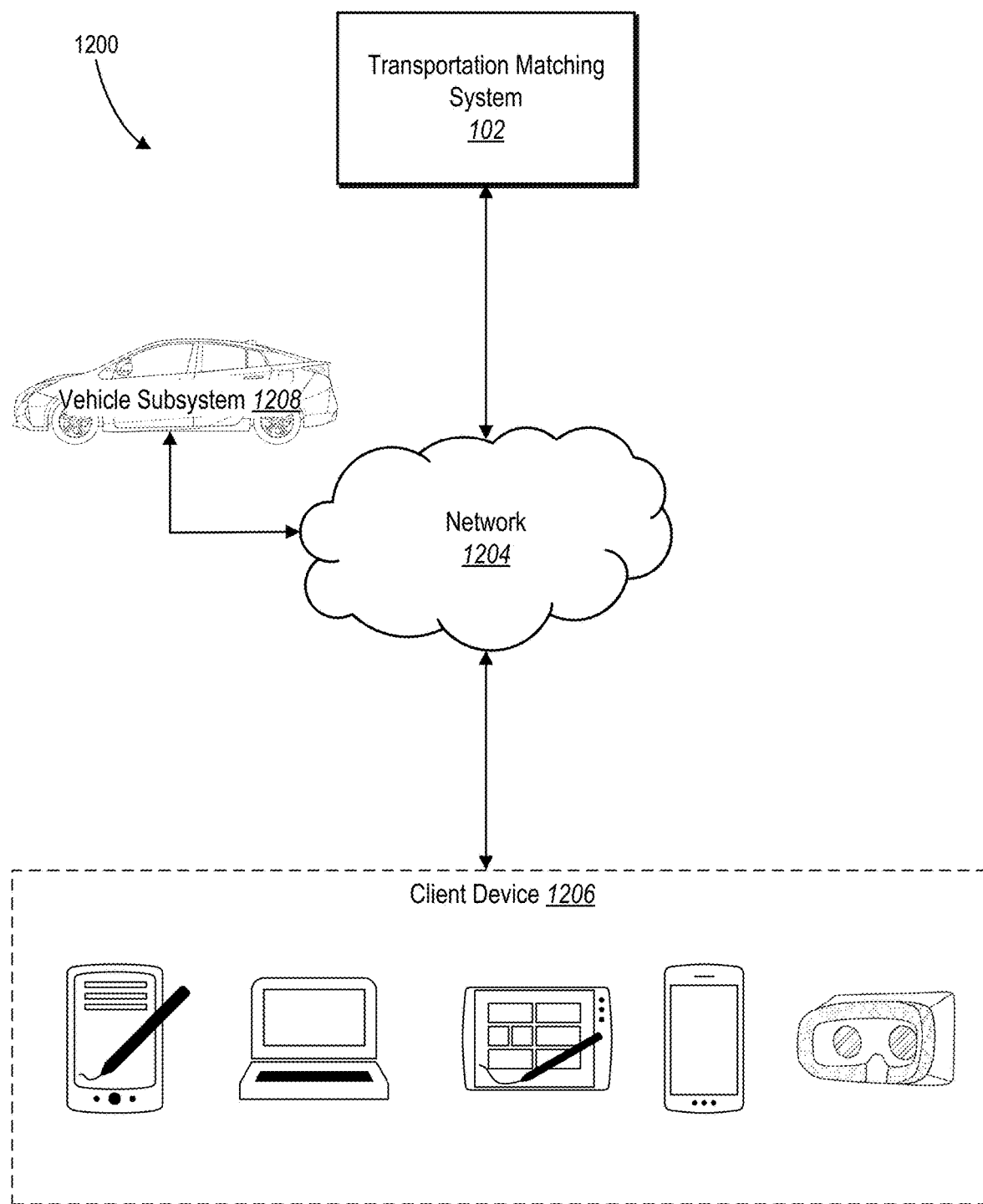
FIG. 12 illustrates an example environment for a transportation matching system in accordance with one or more embodiments.

FIG. 12 illustrates an example network environment 1200 of the transportation matching system 102. The network environment 1200 includes a client device 1206 (e.g., the requestor device 108 or the provider device 126), the transportation matching system 102, and a vehicle subsystem 1208 connected to each other by a network 1204. Although FIG. 12 illustrates a particular arrangement of the client device 1206, the transportation matching system 102, the vehicle subsystem 1208, and the network 1204, this disclosure contemplates any suitable arrangement of client device 1206, the transportation matching system 102, the vehicle subsystem 1208, and the network 1204. As an example, and not by way of limitation, two or more of client device 1206, the transportation matching system 102, and the vehicle subsystem 1208 communicate directly, bypassing network 1204. As another example, two or more of client device 1206, the transportation matching system 102, and the vehicle subsystem 1208 may be physically or logically co-located with each other in whole or in part.

Moreover, although FIG. 12 illustrates a particular number of client devices 1206, transportation matching system 102, vehicle subsystems 1208, and networks 1204, this disclosure contemplates any suitable number of client devices 1206, transportation matching system 102, vehicle subsystems 1208, and networks 1204. As an example, and not by way of limitation, network environment 1200 may include multiple client device 1206, transportation matching system 102, vehicle subsystems 1208, and/or networks 1204.

This disclosure contemplates any suitable network 1204. As an example, and not by way of limitation, one or more portions of network 1204 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1204 may include one or more networks 1204.

Links may connect client device 1206, route-summary-truncation system 104, and vehicle subsystem 1208 to network 1204 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by client device 1206. As an example, and not by way of limitation, a client device 1206 may include any of the computing devices discussed above in relation to FIG. 11. A client device 1206 may enable a network user at the client device 1206 to access the network 1204. A client device 1206 may enable its user to communicate with other users at other client devices 1206.

In particular embodiments, the client device 1206 may include a requestor application or a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at the client device 1206 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1206 one or more Hyper Text Markup Language ("HTML") files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. The transportation matching system 102 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the transportation matching system 102. In addition, the transportation matching system 102 may manage identities of service requestors such as users/requestors. In particular, the transportation matching system 102 may maintain requestor data such as driving/riding histories, personal data, or other user data in addition to navigation and/or traffic management services or other location services (e.g., GPS services).

In particular embodiments, the transportation matching system 102 may manage transportation matching services to connect a user/requestor with a vehicle and/or provider. By managing the transportation matching services, the transportation matching system 102 can manage the distribution and allocation of resources from vehicle systems and user resources such as GPS location and availability indicators, as described herein.

The transportation matching system 102 may be accessed by the other components of network environment 1200 either directly or via network 1204. In particular embodiments, the transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a transportation matching system 102 to manage, retrieve, modify, add, or delete, the information stored in data store.

In particular embodiments, the transportation matching system 102 may provide users with the ability to take actions on various types of items or objects, supported by the transportation matching system 102. As an example, and not by way of limitation, the items and objects may include transportation matching networks to which users of the transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 102 or by an external system of a third-party system, which is separate from transportation matching system 102 and coupled to the transportation matching system 102 via a network 1204.

In particular embodiments, the transportation matching system 102 may be capable of linking a variety of entities. As an example, and not by way of limitation, the transportation matching system 102 may enable users to interact with each other or other entities, or to allow users to interact with these entities through an application programming interfaces ("API") or other communication channels.

In particular embodiments, the transportation matching system 102 may include a variety of servers, sub-systems, programs, modules, logs, and data stores. In particular embodiments, the transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requestor profile) store, connection store, third-party content store, or location store. The transportation matching system 102 may also include suitable components such as network interfaces, security mechanisms, load balancers, failover servers, management-and-network-operations consoles, other suitable components, or any suitable combination thereof. In particular embodiments, the transportation matching system 102 may include one or more user-profile stores for storing user profiles for transportation providers and/or transportation requestors. A user profile may include, for example, biographic information, demographic information, behavioral information, social information, or other types of descriptive information, such as interests, affinities, or location.

The web server may include a mail server or other messaging functionality for receiving and routing messages between the transportation matching system 102 and one or more client devices 1206. An action logger may be used to receive communications from a web server about a user's actions on or off the transportation matching system 102. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of the transportation matching system 102. A privacy setting of a user determines how particular information associated with a user can be shared. The authorization server may allow users to opt in to or opt out of having their actions logged by the transportation matching system 102 or shared with other systems, such as, for example, by setting appropriate privacy settings. Third-party-content-object stores may be used to store content objects received from third parties. Location stores may be used for storing location information received from client devices 1206 associated with users.

In addition, the vehicle subsystem 1208 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) can be mounted on the top of the vehicle subsystem 1208 or else can be located within the interior of the vehicle subsystem 1208. In certain embodiments, the sensor(s) can be located in multiple areas at once i.e., split up throughout the vehicle subsystem 1208 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 1208 may include a communication device capable of communicating with the client device 1206 and/or the route-summary-truncation system 104. For example, the vehicle subsystem 1208 can include an on-board computing device communicatively linked to the network 1204 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
    at least one processor; and
    a non-transitory computer-readable medium comprising instructions that, when executed by the at least one processor, cause the system to:
    based on user interaction with a graphical user interface of a mobile device, generate a digital transit route comprising a multi segment route to a destination location and utilizing one or more transit vehicles, wherein the multi-segment route comprises multi-modal transportation that includes at least two of a bus route, a train route, a walking route, or a bike route;
    generate a graphical route summary comprising transportation segment graphics for the multi-segment route of the digital transit route, the graphical route summary comprising:
        at least one of a route-segment name for at least one of the bus route, the train route, the walking route, or the bike route; or
        a route segment duration indicator for at least one of the bus route, the train route, the walking route, or the bike route;
    generate a threshold size for a truncated graphical route summary based on a determined size of the graphical user interface;
    perform a set of segment-level-truncation operations on the transportation segment graphics from the graphical route summary to generate segment-level truncated transportation segment graphics, wherein the segment-level-truncation operations comprise:

removing space between a segment graphic and an additional segment graphic based on a threshold pixel distance between the segment graphic and the additional segment graphic for the at least two of the bus route, the train route, the walking route, or the bike route; and at least one of removing a transportation segment graphic from the multi-segment route that comprises the multi-modal transportation, collapsing two or more of the transportation segment graphics from the multi-segment route that comprises the multi-modal transportation, or replacing the route-segment name with a vehicle icon;

perform a set of summary-level-truncation operations on the segment-level truncated transportation segment graphics to generate the truncated graphical route summary that conforms with the threshold size, wherein the set of summary-level-truncation operations comprise at least one of: removing space between the segment-level truncated transportation segment graphics; removing the route segment duration indicator for at least one of the bus route, the train route, the walking route or the bike route; or removing a terminal segment graphic from the segment-level truncated transportation segment graphics for at least one of the bus route, the train route, the walking route, or the bike route; and provide, for display within the graphical user interface, the truncated graphical route summary that indicates the multi-segment route comprising the multi-modal transportation.

2. The system as recited in claim 1, further comprising instructions that, when executed by the at least one processor, cause the system to perform the set of segment-level-truncation operations by:

performing a segment-level-truncation operation on a first transportation segment graphic from the transportation segment graphics;

determining that the graphical route summary is not within a threshold size for the graphical user interface; and performing the segment-level-truncation operation on a second transportation segment graphic from the transportation segment graphics.

3. The system as recited in claim 1, further comprising instructions that, when executed by the at least one processor, cause the system to perform the set of segment-level-truncation operations by:

performing a first segment-level-truncation operation on a transportation segment graphic from the transportation segment graphics;

determining that the graphical route summary exceeds a threshold size for the graphical user interface; and performing a second segment-level-truncation operation on the transportation segment graphic from the transportation segment graphics.

4. The system as recited in claim 1, wherein the set of segment-level-truncation operations comprises removing a character within the route-segment name from a transportation segment graphic within the graphical route summary.

5. The system as recited in claim 1, further comprising instructions that, when executed by the at least one processor, cause the system to:

determine the digital transit route comprises a group of alternative route segments;

generate the graphical route summary by identifying transportation segment graphics for alternative route segments within the group of alternative route segments; and perform a segment-level-truncation operation from the set of segment-level-truncation operations by:

shortening a route-segment name from a segment graphic for an alternative route segment from the alternative route segments; or removing the segment graphic for the alternative route segment when the group of alternative route segments exceeds a maximum number of route segments.

6. The system as recited in claim 1, wherein the set of summary-level-truncation operations comprises at least one of:

removing a biking segment graphic from the graphical route summary; or removing a walking segment graphic from the graphical route summary.

7. The system as recited in claim 1, further comprising instructions that, when executed by the at least one processor, cause the system to perform the set of segment-level-truncation operations on the transportation segment graphics by performing a segment-level-truncation operation on a terminal segment graphic from the transportation segment graphics until at least one of determining the graphical route summary is within a threshold size for the graphical user interface or exhausting the set of segment-level-truncation operations.

8. A method comprising:

based on user interaction with a graphical user interface of a mobile device, generating a digital transit route comprising a multi-segment route to a destination location and utilizing one or more transit vehicles, wherein the multi-segment route comprises multi-modal transportation that includes at least two of a bus route, a train route, a walking route, or a bike route;

generating a graphical route summary comprising transportation segment graphics for the multi-segment route of the digital transit route, the graphical route summary comprising:

at least one of a route-segment name for at least one of the bus route, the train route, the walking route, or the bike route; or a route segment duration indicator for at least one of the bus route, the train route, the walking route, or the bike route;

generating a threshold size for a truncated graphical route summary based on a determined size of the graphical user interface;

performing a set of segment-level-truncation operations on the transportation segment graphics from the graphical route summary to generate segment-level truncated transportation segment graphics, wherein the segment-level-truncation operations comprise:

removing space between a segment graphic and an additional segment graphic based on a threshold pixel distance between the segment graphic and the additional segment graphic for the at least two of the bus route, the train route, the walking route, or the bike route; and at least one of removing a transportation segment graphic from the multi-segment route that comprises the multi-modal transportation, collapsing two or more of the transportation segment graphics from the multi-segment route that comprises the multi-modal transportation, or replacing the route-segment name with a vehicle icon;

performing a set of summary-level-truncation operations on the segment-level truncated transportation segment graphics to generate the truncated graphical route summary that conforms with the threshold size wherein the set of summary-level-truncation operations comprise at least one of: removing space between the segment-level truncated transportation segment graphics; removing the route segment duration indicator for at least one of the bus route, the train route, the walking route or the bike route; or removing a terminal segment graphic from the segment-level truncated transportation segment graphics for at least one of the bus route, the train route, the walking route, or the bike route; and providing, for display within the graphical user interface, the truncated graphical route summary that indicates the multi-segment route comprising the multi-modal transportation.

9. The method as recited in claim 8, wherein performing the set of summary-level-truncation operations comprises:
performing a first summary-level-truncation operation on the graphical route summary;
determining that the graphical route summary exceeds a threshold size for the graphical user interface; and
performing a second summary-level-truncation operation on the graphical route summary.

10. The method as recited in claim 8, further comprising performing the set of segment-level-truncation operations on the transportation segment graphics by:
performing a first summary-level-truncation operation on the graphical route summary;
determining that the graphical route summary is within a threshold size for the graphical user interface; and
determining not to perform a second summary-level-truncation operation.

11. The method as recited in claim 8, wherein the set of segment-level-truncation operations comprises shortening the route-segment name from a transportation segment graphic for an alternative route segment.

12. The method as recited in claim 8, further comprising performing the set of segment-level-truncation operations on the transportation segment graphics by performing a segment-level-truncation operation on a terminal transportation segment graphic from the transportation segment graphics until at least one of determining the graphical route summary is within a threshold size for the graphical user interface or exhausting the set of segment-level-truncation operations.

13. The method as recited in claim 8, further comprising:
determining that at least one of the bus route, the train route, the walking route, or the bike route from the multi-segment route segments corresponds to a geographic region;
identifying a local segment graphic for at least one of the bus route, the train route, the walking route, or the bike route based on determining that at least one of the bus route, the train route, the walking route, or the bike route corresponds to the geographic region; and
truncating the graphical route summary by depicting the multi-segment route with the local segment graphic within the truncated graphical route summary.

14. The method as recited in claim 8, further comprising performing the set of segment-level-truncation operations on the transportation segment graphics by:

performing a segment-level-truncation operation on a first transportation segment graphic from the transportation segment graphics; and
determining not to perform the segment-level-truncation operation on a second transportation segment graphic from the transportation segment graphics.

15. A non-transitory computer-readable medium comprising instructions that, when executed by at least one processor, cause a computing device to:
based on user interaction with a graphical user interface of a mobile device, generate a digital transit route comprising a multi-segment route to a destination location and utilizing one or more transit vehicles, wherein the multi-segment route comprises multi-modal transportation that includes at least two of a bus route, a train route, a walking route, or a bike route;
generate a graphical route summary comprising transportation segment graphics for the multi-segment route of the digital transit route, the graphical route summary comprising:
at least one of a route-segment name for at least one of the bus route, the train route, the walking route, or the bike route; or
a route segment duration indicator for at least one of the bus route, the train route, the walking route, or the bike route;
generate a threshold size for a truncated graphical route summary based on a determined size of the graphical user interface;
perform a set of segment-level-truncation operations on the transportation segment graphics from the graphical route summary to generate segment-level truncated transportation segment graphics, wherein the segment-level-truncation operations comprise:
removing space between a segment graphic and an additional segment graphic based on a threshold pixel distance between the segment graphic and the additional segment graphic for the at least two of the bus route, the train route, the walking route, or the bike route; and
at least one of removing a transportation segment graphic from the multi-segment route that comprises the multi-modal transportation, collapsing two or more of the transportation segment graphics from the multi-segment route that comprises the multi-modal transportation, or replacing the route-segment name with a vehicle icon;
perform a set of summary-level-truncation operations on the segment-level truncated transportation segment graphics to generate the truncated graphical route summary that conforms with the threshold size, wherein the set of summary-level-truncation operations comprise at least one of: removing space between the segment-level truncated transportation segment graphics; removing the route segment duration indicator for at least one of the bus route, the train route, the walking route or the bike route; or removing a terminal segment graphic from the segment-level truncated transportation segment graphics for at least one of the bus route, the train route, the walking route, or the bike route; and
provide, for display within the graphical user interface, the truncated graphical route summary that indicates the multi-segment route comprising the multi-modal transportation.

16. The non-transitory computer-readable medium as recited in claim 15, further comprising instructions that, when executed by the at least one processor, cause the computing device to:
- determine the multi-segment route comprise a biking segment or a walking segment; and
- perform the set of summary-level-truncation operations by removing a time-duration indicator for a biking segment graphic corresponding to the biking segment or a walking segment graphic corresponding to the walking segment.

17. The non-transitory computer-readable medium as recited in claim 15, wherein the set of segment-level-truncation operations comprises at least one of removing a character within the route-segment name from a transportation segment graphic within the graphical route summary.

18. The non-transitory computer-readable medium as recited in claim 15, further comprising instructions that, when executed by the at least one processor, cause the computing device to:
- determine the digital transit route comprises a group of alternative route segments;
- generate the graphical route summary by identifying transportation segment graphics for alternative route segments within the group of alternative route segments; and
- perform a segment-level-truncation operation from the set of segment-level-truncation operations by:
- shortening a route-segment name from a segment graphic for an alternative route segment from the alternative route segments; or
- removing the segment graphic for the alternative route segment when the group of alternative route segments exceeds a maximum number of route segments.

19. The non-transitory computer-readable medium as recited in claim 15, further comprising instructions that, when executed by the at least one processor, cause the computing device to perform the set of segment-level-truncation operations by:
- performing a segment-level-truncation operation on a first transportation segment graphic from the transportation segment graphics;
- determining that the graphical route summary is not within a threshold size for the graphical user interface; and
- performing the segment-level-truncation operation on a second transportation segment graphic from the transportation segment graphics.

20. The non-transitory computer-readable medium as recited in claim 15, further comprising instructions that, when executed by the at least one processor, cause the computing device to:
- determine that at least one of the bus route, the train route, the walking route, or the bike route from the multi-segment route corresponds to a geographic region; and
- based on the geographic region of the multi-segment route indicating a threshold level of familiarity of a user of the mobile device:
- identify a local segment graphic for at least one of the bus route, the train route, the walking route, or the bike route based on determining that at least one of the bus route, the train route, the walking route, or the bike route corresponds to the geographic region; and
- truncate the graphical route summary by depicting the multi-segment route with the local segment graphic within the truncated graphical route summary.

* * * * *